3,798,210
GLYCOSIDYL-PTERIDINES
Wolfgang Pfleiderer, Constance, Germany, assignor to Ciba-Geigy Corporation, Ardsley, N.Y.
No Drawing. Filed Dec. 31, 1970, Ser. No. 103,350
Claims priority, application Switzerland, Jan. 6, 1970, 39/70; Nov. 18, 1970, 17,024/70
Int. Cl. C07c 95/04, 51/50
U.S. Cl. 260—211.5 R          11 Claims

ABSTRACT OF THE DISCLOSURE

Compounds of the formula

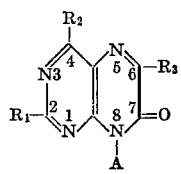

wherein A stands for a member selected from 1-aldopentosidyl, 1-aldohexosidyl, partially desoxygenated 1-aldopentosidyl, partially desoxygenated 1-aldohexosidyl, one of said radicals with free hydroxyl groups, hydroxyl groups esterified by a member selected from lower alkanoyl and aroyl or etherified by aryl-lower alkyl, $R_1$, $R_2$ and $R_3$ each stands for a member selected from hydrogen, lower alkyl, aryl-lower alkyl, phenyl, lower alkyl phenyl, lower alkoxy phenyl, halogeno phenyl, trifluoromethyl phenyl, free amino, mono-lower alkylamino, di-lower alkylamino, aryl amino, N-aryl-N-lower alkylamino, hydroxy, lower alkoxy, aryl-lower alkoxy, halogen, mercapto, lower alkylmercapto, aryl-lower alkylmercapto, carboxy, lower alkoxy carbonyl and aryl-lower alkoxy carbonyl, their tautomers and salts are useful as antibacterial and antiviral agents.

The invention relates to the manufacture of glycosidyl-pteridines.

Glycosidyl-pteridines have hitherto only been accessible according to a cyclization process described by Todd et al. (J. Chem. Soc. 1951, 3). This synthetic route, described for 2-methylmercapto-4-amino-6,7-dioxo-8-[β-D-glucopyranosidyl-(1)]-5,6,7,8-tetrahydropteridine, via a 5-amino-6-(1-glucosidylamino)-pyrimidine and reaction with oxalic acid diethyl ester, does not permit the manufacture of glycosidyl-pteridines with any desired substitutents and gives a low yield and is involved and uneconomical.

Pfleiderer et al. (Chem. Ber. 1966, 3022) manufactured 2-dimethylamino-6-methyl-7-oxo-8-[β-D-glucopyranosidyl-(1)]-peteridine, the corresponding galactopyranosidyl-(1) compound as well as their 2',3',4',6'-tetra-O-acetyl derivatives, again in accordance with this synthesis principle.

Further, 4-dimethylamino-6-methyl-7-oxo-8-[β-D-glucopyranosidyl-(1)]-7,8-dihydropeteridine, its 2',3',4',6'-tetra-O-acetyl compound and 4-dimethylamino-7-oxo-8-[2',3',4',6'-tetra-O-acetyl-β-D-glucopyranosidyl - (1)]-7,8-dihydropteridine were manufactured analogously (J. Het. Chem. 1964, 23).

Birkofer and Ritter (Ang. Chem. 1964, 414) were the first to succeed in glycosidizing purine derivatives in the 3-position via silyl compounds. The assumption that this synthesis could be applied to 2-oxo-1,2-hydro-quinoxaline and 2-oxo-3-methyl-1,2 - dihydro-quinoxaline however proved to be false (Pteridine Chemistry, supra, 100–103). The O-silyl compounds first manufactured did not give the desired glucosidyl derivatives with α-acetobromo-glucose even under drastic reaction conditions. From this the expert draws the same conclusion as the author, that the synthesis of pteridine-$N_8$-glycosides by direct glycosidation is not realisable by this route.

Starting from this state of the art, the invention relates to the new 7-oxo-8-glycosidyl-7,8-dihydro-pteridines of Formula I

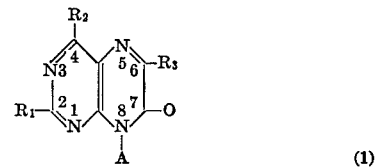

wherein A represents a 1-aldopentosidyl or 1-aldohexosidyl radical which is optionally partially desoxygenated and/or optionally possesses functionally modified hydroxyl groups, $R_1$, $R_2$ and $R_3$, which can be identical or different, each represents an optionally functionally modified hydroxyl or mercapto group, an optionally substituted amino group, an optionally functionally modified carboxyl group, an organic radical or hydrogen, and with the restriction that if $R_1$ represents the methylmercapto group, $R_2$ represents the free amino group and $R_3$ represents the hydroxyl group, A is different from the 1-glucopyranosidyl radical, and, with the exception of 2-methylmercapto - 4-amino-6,7 - dioxo-8-[β-D-glucopyranosidyl-(1)]-5,6,7,8 - tetrahydropteridine, 2-dimethylamino-6-methyl-7-oxo-8-[β-D - glucopyranosidyl-(1)]-7, 8-dihydro-pteridine, the corresponding galactopyranosidyl-(1) compound as well as their 2',3',4',6'-tetrahydro-O-acetyl derivatives thereof, and 4-dimethylamino-6-methyl-7 - oxo-8-[β-D - glycopyranosidyl-(1)]-7,8-dihydropteridine, its 2',3',4',6'-tetra-O-acetyl compound and 4-dimethylamino-7-oxo - 8-[2',3',4',6'-tetra-O-acetyl-β-D-glycopyranosidyl-(1)]-7,8 - dihydropteridine, and tautomers of the above compounds which are optionally substituted in at least one of positions 1, 3 and 5 by an organic radical and also of the radicals mentioned for A, in which at least one of the radicals $R_1$, $R_2$ and $R_3$ represents a free hydroxyl or mercapto group or an optionally substituted amino group possessing at least one hydrogen atom, as well as processes for their manufacture.

A 1-aldopentosidyl radical is for example a 1-radical of ribose, arabinose, lyxose or xylose, or a 1-methylaldopentosidyl radical, such as 1-radical of fucose, glucomethylose or rhamnose. Preferably, a 1-aldopentosidyl radical is in the furanose form and primarily represents a 1-ribofuranosidyl radical, as well as a 1-arabinofuranosidyl, 1-lyxofuranosidyl or 1-xylofuranosidyl radical, and also a desoxy-1-aldopentosidyl radical, for example a 2-desoxy-1-ribofuranosidyl radical. In a 1-aldopentosidyl radical, the hydroxyl groups are free or functionally modified.

A 1-aldohexosidyl radical is for example a 1-radical of glucose, allose, altrose, galactose or mannose. Preferably, a 1-aldohexosidyl radical is in the pyranose form and primarily represents a 1-glucopyranosidyl, 1-galactopyranosidyl or 1-mannopyranosidyl radical. In a 1-aldohexosidyl radical, the hydroxyl groups are free or functionally modified.

An organic radical is especially an optionally substituted aliphatic, cycloaliphatic, cycloaliphatic-aliphatic, araliphatic or aromatic hydrocarbon radical or an optionally substituted heterocyclic or heterocyclic-aliphatic radical.

Aliphatic hydrocarbon radicals, whereby there are also to be understood aliphatic parts of cycloaliphatic-aliphatic and araliphatic hydrocarbon radicals, as well as of heterocyclic-aliphatic radicals, are above all lower alkyl, lower alkenyl or lower alkinyl radicals.

Cycloaliphatic hydrocarbon radicals are primarily cycloalkyl or cycloalkenyl radicals, optionally containing endo bonds or endo bridges, which in cycloaliphatic-aliphatic hydrocarbon radicals are above all bonded to lower alkyl radicals.

Araliphatic hydrocarbon radicals are for example aryl-lower alkyl or aryl-lower alkenyl radicals, such as monocyclic or bicyclic aryl-lower alkyl or aryl-lower alkenyl radicals.

Aromatic hydrocarbon radicals are aryl radicals, for example monocyclic or bicyclic aryl radicals.

Heterocyclic radicals are primarily monocyclic or bicyclic heterocyclic radicals of aromatic character, such as pyridyl, pyrrolyl, pyrazolyl, imidazolyl, furyl, thienyl, thiazolyl or oxazolyl radicals which in heterocyclic-aliphatic radicals are above all bonded to lower alkyl radicals.

The abovementioned radicals can optionally be monosubstituted disubstituted or polysubstituted. Thus aliphatic hydrocarbon radicals, including also aliphatic radicals of cycloaliphatic-aliphatic and araliphatic hydrocarbon groups, as well as of heterocyclic-aliphatic groups, especially loweralkyl radicals, can possess functional groups, such as functionally modified hydroxyl or mercapto groups or optionally substituted amino groups, as substituents. The trifluoromethyl group may here be mentioned by way of an example. Aromatic hydrocarbon radicals, including also aromatic radicals of araliphatic hydrocarbon groups, as well as heterocyclic radicals of aromatic character, can for example contain lower alkyl radicals, functionally modified hydroxyl or mercapto groups, trifluoromethyl nitro or optionally substituted amino groups as substituents, whilst cycloaliphatic hydrocarbon radicals can above all possess lower alkyl radicals or endo-lower alkylene radicals as substituents.

Lower alkyl radicals are, for example, methyl or ethyl radicals or straight or branched propyl, butyl, pentyl, hexyl or heptyl radicals bonded in any desired position, whilst lower alkenyl radicals for example represent allyl, propenyl, methallyl, 3-butenyl or crotyl radicals, and lower alkinyl radicals for example represent propargyl, 2-butinyl or 3-butinyl radicals.

Cycloalkyl and cycloalkenyl radicals preferably contain up to 10 ring carbon atoms and in particular denote cyclopentyl, cyclohexyl or cycloheptyl radicals, as well as cyclopentenyl or cyclohexenyl radicals.

Phenyl-lower alkyl and phenyl-lower alkenyl radicals are for example benzyl, phenylethyl or phenylpropyl, as well as cinnamyl radicals.

Aromatic radicals are primarily phenyl radicals, but can also be naphthyl radicals, for example 1-naphthyl or 2-naphthyl radicals.

Pyridyl radicals are 2-, 3- or 4-pyridyl radicals, whilst pyrrolyl radicals are for example 2-pyrrolyl radicals, pyrazolyl radicals are for example 3- or 4-pyrazolyl radicals, imidazolyl radicals are for example 2-imidazolyl radicals, furyl radicals are for example 2-furyl radicals, thienyl radicals are for example 2-thienyl radicals, thiazolyl radicals are for example 2-thiazolyl radicals or oxazolyl radicals are for example 2-oxazolyl radicals.

Lower alkyl radicals which carry aryl groups and heterocyclic radicals are for example methyl or ethyl radicals.

Endo bridges are primarily endo-lower alkylene radicals, for example methylene, ethylene or 2,2-propylene radicals.

Functionally modified hydroxyl and mercapto groups are etherified or esterified hydroxyl and mercapto groups, such as halogen atoms or acyloxy groups, lower alkoxy, lower alkenyloxy, cycloalkoxy, cycloalkyl-lower alkoxy or aryl-lower alkoxy groups, as well as lower alkylenedioxy groups, and also lower alkylmercapto groups. Functionally modified hydroxyl groups in a 1-pentosidyl or 1-hexosidyl radical are primarily hydroxyl groups etherified or esterified by organic radicals.

Halogen atoms are primarily those with an atomic weight of less than 80, that is to say fluorine, chlorine or bromine atoms.

Acyloxy groups are especially lower alkanoyloxy groups, for example acetoxy or propionyloxy groups, as well as aroyloxy groups, for example benzoyloxy groups.

Lower alkoxy groups are for example methoxy, ethoxy, n-propoxy or isopropoxy groups, whilst lower alkenyloxy groups for example represent allyloxy groups. In cycloalkoxy and cycloalkyl-lower alkoxy groups the cycloaliphatic radical contains up to 10 ring carbon atoms. Radicals of this nature are cyclopentyloxy and cyclohexyloxy groups, as well as cyclopropylmethoxy, cyclopentylmethoxy, cyclohexylmethoxy or 2-cyclohexylethoxy groups. Aryl-lower alkoxy groups which are in particular also suitable for the etherification of hydroxyl groups in the 1-pentosidyl and 1-hexosidyl radical, are primarily phenyl-lower alkoxy groups, for example benzyloxy or 2-phenylethoxy groups, and an aromatic radical in such groups can optionally be substituted as noted above. A lower alkylenedioxy radical is for example a methylenedioxy group; in the 1-pentosidyl or 1-hexosidyl radical two hydroxyl groups can be etherified by a methylene radical which is preferably substituted, for example a benzylidene or isopropylidene radical.

Lower alkylmercapto groups are for example methylmercapto or ethylmercapto groups.

Optionally substituted amino groups are secondary or tertiary amino groups which for example contain, as substituents, lower alkyl radicals, or bivalent radicals such as lower alklene, oxa-lower alkylene, thia-lower alkylene or aza-lower alkylene radicals, wherein an aza nitrogen atom can optionally be substituted, for example by one of the above-mentioned hydrocarbon radicals, above all a lower alkyl radical as well as an optionally substituted phenyl or phenyl-lower alkyl radical, for example 1,4-butylene, 1,5-pentylene, 3-oxa-1,5-pentylene, 3-thia-1,5-pentylene or 3-aza-1,5-pentylene, such as 3-lower alkyl-3-aza-1,5-pentylene, for example 3-methyl-3-aza-1,5-pentylene groups. Further substituted amino groups are the hydrazino group, which can optionally be monosubstituted or disubstituted by a lower alkyl radical, as well as the hydroxyamino group.

Carboxyl groups which are optionally functionally modified are, for example, esterified or amidised carboxyl groups.

Esterified carboxyl groups are especially those which are esterified with aliphatic, cycloaliphatic or araliphatic alcohols. Ester-forming alcohols are especially lower alkanols, cycloalkanols or phenylalkanols, which can also possess yet further substituents, for example methanol, ethanol, propanols, butanols, hexanols, cyclopentanols, cyclohexanols or substituted phenyl-lower alkanols substituted as indicated above for the aryl-lower alkyl radicals, such as benzyl alcohols or phenylethanols.

Substituents of the aliphatic alcohols are especially amino groups, preferably amino groups subssituted as given below for the amide groups, and above all di-lower alkylamino groups, for example dimethylamino or diethylamino groups, or piperidino groups.

In the amidised carboxyl groups (carbamyl groups) the amide nitrogen atom can be unsubstituted, monosubstituted or disubstituted, for example by preferably lower radicals of aliphatic character, for example radicals of aliphatic character possessing at most 8 carbon atoms, which can also be interrupted by hetero-atoms, such as oxygen, nitrogen or sulphur atoms, and/or substituted by functional groups, such as hydroxyl, amino or mercapto groups or halogen atoms. As amide substituents, alkyl, alkenyl or alkylene radicals may for example be mentioned which can also be interrupted by oxygen, sulphur or nitrogen atoms and/or substituted by functional groups, such as hydroxyl, amino or mercapto groups or halogen atoms. Possible amide substituents are especially: lower alkyl radicals such as methyl, ethyl, n-propyl or isopropyl, straight or branched butyl, pentyl, hexyl or heptyl bonded in any desired position, lower alkenyl radicals, such as for example allyl or methallyl, lower alkylene radicals such as for example butylene-(1,4), pentylene-(1,5), hexylene-1,6) or heptylene-2,6), cycloalkyl or cycloalkyl-alkyl radicals or corresponding radicals interrupted by the hetero-atoms mentioned, such as for example lower alkoxyalkyl, alkylmercaptoalkyl or mono- or di-alkylaminoalkyl radicals such as for example 2-methoxyethyl, 2-ethoxyethyl, 3-methoxypropyl, 2-methylmercaptoethyl or dimethyl-, methylethyl- or diethyl-aminoalkyl groups, alkyleneamionalkyl groups or oxa-, aza- or thia-alkyleneamionalkyl groups, wherein possible alkylene radicals or oxa-, aza- or thia-alkylene radicals are for example those mentioned below, or oxa-, aza- or thia-alkylene radicals such as 3-oxa, 3-aza- or 3-thia-pentylene-(1,5), 3-methyl- or 3-ethyl-3-aza-hexylene-(1,6), 3-aza-hexylene-(1,6) or 4-methyl-4-aza-heptylene-(2,6), or radicals of this nature substituted by functional groups, such as 3-chlor-ethyl- or 3-hydroxyethyl-3-aza-pentylene-(1,5), phenyl radicals or phenylalkyl radicals which can be unsubstituted or above all substituted in the phenyl radical as indicated for the phenyl-lower alkyl radicals.

The amino group of the amidised carboxyl group (carbamyl group) is in particular a free, mono- or di-lower alkylated amino group, or an optionally C-lower alkylated pyrrolidino, piperidino, morpholino, thiomorpholino, piperazino, N'-lower alkylpiperazino or N'-(hydroxy-lower alkyl)-piperazino group, for example the N'-methyl-piperazino group or the N'-(β-hydroxyethyl)-piperazino group, or N'-phenylpiperazino group or also an amino group substituted by a hydroxyl or amino group.

The radicals mentioned are preferably lower radicals, with "lower" denoting that they do not possess more than 8 atoms, above all 1–6 atoms. The same is true of radicals which are substituents of the radicals mentioned.

The compounds according to the invention possess valuable pharmacological properties. Thus they for example display effects against malaria and tubercle bacilli, pathogenic fungi, as well as trichomonades or amoebae, and also against gram-positive and gram-negative bacteria and primarily against viruses, especially against herpes virus and influenza virus, as can be shown in vitro on a tissue culture infected with herpes simplex or influenza virus in concentrations of approx. 3–30 γ/ml. and are accordingly useful as, especially as anti-bicterial agents, especially agents which are active against viruses. They are furthermore useful as starting substances for the manufacture of other valuable compounds, especially pharmacologically active compounds.

Compounds to be particularly highlighted are those of Formula I wherein, with the above exceptions, A represents a 1-aldopentosidyl or 1-aldohexosidyl radical which is optionally partially desoxygenated and/or possesses optionally functionally modified hydroxyl groups, and $R_1$, $R_2$ and $R_3$, which can be identical or different, each represents an optionally functionally modified hydroxyl or mercapto group, an optionally substituted amino group, an optionally functionally modified carboxyl group, an organic radical or hydrogen.

Particularly valuable compounds of this nature are compounds of Formula I wherein, with the above exceptions, A represents a 1-ribofuranosidyl, 2-desoxy-1-ribofuranosidyl, 1-arabino-furanosidyl or 1-glucopyranosidyl radical which possesses hydroxyl groups which are optionally esterified by acyl radicals, such as lower alkanoyl or benzoyl radicals, or etherified by benzyl radicals, and $R_1$, $R_2$ and $R_3$, which may be identical or different, each represents hydrogen, a lower alkyl group, an amino group which is monosubstituted or disubstituted by lower alkyl groups or especially a free amino group, a hydroxyl group which is etherified by lower alkyl radicals or optionally esterified by hydrogen halide acids or especially a free hydroxyl group. Suitable above all are compounds of Formula I, wherein, with the above exceptions, A represents a 1-ribofuranosidyl, 2-desoxy-1-ribofuranosidyl, 1-arabinofuranosidyl or a 1-glucopyranosidyl radical which possesses hydroxy groups that are optionally esterified by lower alkanoyl or benzoyl radicals or etherified by benzyl radicals, one of the radicals $R_1$, $R_2$ and $R_3$ represents free amino hydroxy or mercapto and the others in each case represent free amino, mono- or di-lower alkylamino, phenyl- or N-lower alkyl-N-phenyl-amino, in which the phenyl portion optionally is substituted by lower alkyl, lower alkoxy, halogen and/or trifluoromethyl, or represent hydroxy, lower alkoxy, mercapto, lower alkyl mercapto, phenyl-lower alkyl mercapto, halogen, lower alkyl, phenyl-lower alkyl, or hydrogen.

Particularly preferred are compounds of Formula I, wherein A represents a 1-ribofuranosidyl, 2-desoxy-1-ribofuranosidyl or 1-arabinofuranosidyl radical which possesses hydroxy groups that are optionally esterified by acetyl or benzoyl radicals or etherified by benzyl radicals, one of the radicals $R_1$, $R_2$ and $R_3$ represents free amino, hydroxy or mercapto, and the others represent in each case free amino, methylamino, dimethylamino, hydroxy, methoxy, mercapto, methylmercapto, benzylmercapto, fluorine, chlorine, methyl, benzyl or hydrogen.

There may be mentioned, for example:

2-dimethylamino-4-methoxy-7-oxo-8-(1-D-ribofuranosidyl)-7,8-dihydro-pteridine, 2-dimethylamino-7-oxo-8-(1-D-ribofuranosidyl)-7,8-dihydro-pteridine, 2-dimethylamino-7-oxo-8-(2',3',4',6'-tetra-O-acetyl-1-D-glucopyranosidyl)-7,8-dihydro-pteridine, 7-oxo-8-(2',3',4',6'-tetra-O-acetyl-1-D-glucopyranosidyl)-7,8-dihydro-pteridine, 7-oxo-8-(2',3',5'-tri-O-benzoyl-1-D-ribofuranosidyl)-7,8-dihydro-pteridine, and 2-dimethylamino-7-oxo-8-(1-D-desoxyribofuranosidyl)-7,8-dihydro-pteridine and its 3',5'-di-O-p-chlorobenzoyl derivative, as well as, especially:

2-amino-7-oxo-8-(1-D-ribofuranosidyl)-7,8-dihydro-pteridine, 4-amino-7-oxo-8-(1-D-ribofuranosidyl)-7,8-dihydro-pteridine, 2-hydroxy-7-oxo-8-(1-D-ribofuranosidyl)-7,8-dihydro-pteridine, 4-hydroxy-7-oxo-8-(1-D-ribofuranosidyl)-7,8-dihydro-pteridine, 2-hydroxy-4-amino-7-oxo-8-(1-D-ribofuranosidyl)-7,8-dihydro-pteridine, 2,4,6-trihydroxy-7-oxo-8-(1-D-ribofuranosidyl)-7,8-dihydro-pteridine, 2,4,6-triamino-7-oxo-8-(1-D-ribofuranosidyl)-7,8-dihydro-pteridine, 2,6-diamino-4-hydroxy-7-oxo-8-(1-D-ribofuranosidyl)-7,8-dihydro-pteridine, 2,6-dihydroxy-4-amino-7-oxo-8-(1-D-ribofuranosidyl)-7,8-dihydro-pteridine, 2,4-dihydroxy-7-oxo-8-(1-D-ribofuranosidyl)-7,8-dihydro-pteridine and 2,4-diamino-7-oxo-8-(1-D-ribofuranosidyl)-7,8-dihydo-pteridine, 2-amino-4-hydroxy-7-oxo-8-(1-D-ribofuranosidyl)-7,8-dihydro-pteridine and 2-amino-4,6-dihydroxy-7-oxo-8-(1-D-ribofuranosidyl)-7,8-dihydro-pteridine, 2-methylmercapto-4-dimethylamino-7-oxo-7,8-dihydro-8-(1-D-2,3,5-tri-O-benzoyl-ribofuranosidyl)-pteridine, 2-methylmercapto-4-amino-6-methoxycarbonyl-7-oxo-7,8-dihydro-8-(1-D-ribofuranosidyl)-pteridine, 2-methylmercapto-4-amino-6-ethoxycarbonyl-7-oxo-7,8-dihydro-8-(1-D-2,3,5-tri-O-benzoyl)-ribofuranosiyl)-pteridine, 2-amino-4-dimethylamino-7-oxo-7,8-dihydro-8-(1-D-ribofuranosidyl)-pteridine, 4-dimethylamino-7-oxo-7,8-dihydro-8-(1-D-2,3,5-tri-O-benzoyl-ribofuranosidyl)-pteridine, 2-benzylmercapto-4-amino-6-ethoxycarbonyl-7-oxo-7,8-dihydro-8-(1-D-2,3,5-tri-O-benzoyl-ribofuranosidyl)-pteridine, 4-amino-7-oxo-7,8-dihydro-8-(1-D-2,3,5-tri-O-benzoyl-ribofuranosidyl)-pteridine, 2-amino-4-benzyloxy-7-oxo-7,8-dihydro-8-(1-D-2,3,5-tri-O-benzoyl-ribofuranosidyl)-pteridine, 2-methylmercapto-4-amino-7-oxo-7,8-dihydro-8-(1-D-ribofuranosidyl)-pteridine, 2-amino-4-isopropyloxy-7-oxo-7,8-dihydro-8-(1-D-ribofuranosidyl)-pteridine, 2-amino-4-methoxy-7-oxo-7,8-dihydro-8-(1-D-ribofuranosidyl)-pteridine, 2-dimethylamino-4-methoxy-7-oxo-7,8-dihydro-8-(1-D-ribofuranosidyl)-pteridine, and most particularly 2-amino-3-dimethylamino-7-oxo-7,8-dihydro-8-(1-D-ribofuranosidyl)-pteridine, which exhibits in vitro an antiviral activity in a tissue culture infected with a herpes simplex or influenza virus in concentrations of 3-30 γ/ml., as well as, optionally, their O-acetyl and O-benzoyl derivatives, or salts or anomers, especially β-anomers of such compounds, and, furthermore, 2-desoxyribofuranosidyl and arabinofuranosidyl compounds corresponding to these compounds.

It has surprisingly been found that 7-oxo-8-glycosidyl-7,8-dihydro-pteridines of Formula I

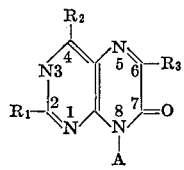

wherein A represents a 1-aldopentosidyl or 1-aldohexosidyl radical which is optionally partially desoxygenated and/or possesses optionally functionally modified hydroxyl groups, and $R_1$, $R_2$ and $R_3$, which can be identical or different, each represents an optionally functionally modified hydroxyl or mercapto group, an optionally substituted amino group, an optionally functionally modified carboxyl group, an organic radical or hydrogen, and tautomers of the above compounds which are optionally substituted in at least one of the positions 1, 3 and 5 by an organic radical and also by one of the radicals mentioned for A, in which at least one of the radicals $R_1$, $R_2$ and $R_3$ represents a free hydroxyl or mercapto group or an optionally substituted amino group possessing at least one hydrogen atom, can be manufactured if a compound of Formula II

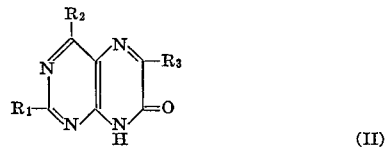

wherein $R_1$, $R_2$ and $R_3$ have the above significance, is O-metallized in at least the 7-position with a compound of a quadrivalent metal of the 4th main group and 3rd to 5th period of the periodic system, and the O-metallized compound is reacted with a compound of Formula III

   A—X   (III)

wherein A has the above significance and X represents a reactive functionally modified hydroxyl group.

A reactive functionally modified hydroxyl group is especially a reactive esterified or etherified hydroxyl group.

In a compound of Formula III, a reactive esterified hydroxyl group is especially a hydroxyl group which is esterified by an inorganic or organic acid, such as an alkylcarboxylic or arylcarboxylic acid, for example acetic acid or benzoic acid, by an arylsulphonic acid, for example p-toluenesulphonic acid, and preferably by a hydrohalic acid, for example hydrochloric acid, hydrobromic acid or hydriodic acid. Further hydroxyl groups present in the sugar residue are esterified or etherified in a suitable manner as indicated above, preferably by benzyl, benzoyl or acetyl groups.

A reactive etherified hydroxy group is especially a hydroxyl group etherified by an aliphatic or aromatic hydrocarbon radical, it being possible for the aliphatic or aromatic hydrocarbon radicals also to be optionally substituted, especially as stated above. Primarily suitable are lower alkoxy and aryloxy groups, such, for example, as methoxy and phenoxy groups. Preferably further hydroxy groups present in the sugar residue are esterified or etherified as indicated above, preferably by benzyl, benzoyl or acetyl groups.

The O-metallization of a compound of Formula II can be carried out with compounds of quadrivalent germanium, tin and especially silicon. For example, a compound of Formula II can be reacted with a tri-lower alkyl-germanium halide, such as trimethyl-germanium chloride, or a tri-lower alkyl-tin halide, such as trimethyl- or triethyl-tin chloride. The manufacture of the O-metallized compounds can above all be carried out by reaction of a compound of Formula II with a trialkyl-silyl, triaryl-silyl or tri-(arylalkyl)-silyl compound, such as with a tri-lower alkyl-halogenosilane, N-tri-lower alkyl-silyl-di-lower alkylamine, bis-tri-lower alkylsilyl-lower alkanoylamide or tri-lower alkylsilyl-N-lower alkyl-lower alkanoylamide, or also with a hexa-lower alkyldisilazane, preferably with trimethyl-chlorosilane, N-trimethylsilyl-diethylamine, bis-trimethylsilyl - acetamide, trimethylsilyl-N-methylacetamide and especially with hexamethyldisilazane.

In the above O-metallizations, above all in reactions with hexa-lower alkyldisilazanes, a catalyst is used in a suitable manner, especially an acid catalyst, such as a strong inorganic acid, preferably concentrated sulphuric acid, or a salt thereof which reacts acid, such as for example ammonium sulphate or ammonium bisulphate. The metallizing agent, especially the silylizing agent, is advantageously used in excess and/or simultaneously used as the solvent. The reaction can however also be carried out in an inert solvent, for example benzene or toluene, and optionally at elevated temperature.

In the reaction with one of the abovementioned metal halides, such as trimethylchlorosilane, a halogen-binding substance, such as an organic nitrogen base, for example triethylamine or pyridine, is advantageously added in order to lower the reaction temperature and the duration of reaction and to increase the yields, in which case the addition of an acid catalyst is superfluous.

A very mild O-silylation consists of the reaction of a compound of Formula II with N-trimethylsilylacetamide, preferably in the presence of a tertiary amine, such as triethylamine, in which case only neutral acetamide is produced as a by-product and can be separated off by filtration.

In the reactions mentioned, the process is carried out with exclusion of water. Where appropriate, it is carried out under a protective atmosphere, for example of nitrogen or argon.

In the reaction of the O-metallized pteridine with a compound of Formula III a heavy metal compound is appropriately used, for example heavy metal oxides, hydroxides or salts, especially mercury-(II) oxide, mercury-(II) halides, such as mercury-(II) chloride, or mercury-(II) cyanide. The reaction is carried out at room temperature or preferably at elevated temperature.

O-metallized, above all O-silylized, pteridine can furthermore be reacted with the sugar derivative, in which case the addition of a heavy metal compound and/or of a catalyst can where appropriate be dispensed with. The reaction preferably takes place in an inert solvent, such as benzene, toluene or acetonitrile, at room temperature or at elevated temperature, especially at the boiling point of the solvent, or the reagents are melted together without using a solvent.

The compounds of Formula I can however also be obtained according to methods which are in themselves known, for example if, in a compound of Formula IV

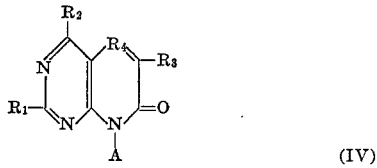

wherein A, $R_1$, $R_2$ and $R_3$ have the significance given for Formula I and $R_4$ represents two radicals which can together be converted into the —N= grouping, or in an appropriate tautomer thereof, $R_4$ is converted into the —N= grouping.

Two radicals $R_4$ which can together be converted into the —N= grouping are for example those in which the radical bonded to the pyrimidine nucleus represents a free amino group and the other represents an optionally reactively modified oxo group or thioxo group.

Reactively modified oxo groups are, for example, hemiethers, bisethers, hemiesters or bisesters of the hydrato form of the oxo group. As ethers, hemiacetals, acetals, hemiketals or ketals may for example be mentioned, and preferably those ethers are used which possess lower alkoxy groups or lower alkylenedioxy groups, such as methoxy, ethoxy or ethylene-1,2-dioxy groups. In hemiesters or bisesters at least one of the two OH groups of the hydrato form is reactively esterified, for example with a strong inorganic acid, especially with a hydrohalic acid, such as hydrochloric or hydrobromic acid, or with an organic carboxylic acid, such as an alkylcarboxylic aid, for example acetic acid. The same is true for reactively modified thioxo groups.

The starting compounds used in this reaction are obtained as intermediates of a compound of Formula V

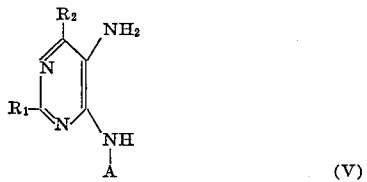

wherein $R_1$, $R_2$ and A have the above significance, or a tautomer corresponding to the abovementioned, is reacted with a compound of Formula VI

wherein $R_3$ has the above significance and X in each case represents an oxo or thioxo group, or with a reactive derivative thereof, and the imino or thioxo group in a 7-imino or 7-thioxo compound which may be obtained is converted into the oxo group.

Preferably, reactive functional acid derivatives are used as compounds of Formula VI, primarily their esters, such as lower alkyl esters, for example methyl or ethyl esters, as well as phenyl-lower alkyl esters, for example benzyl esters, as well as their halides, for example chlorides, and also the corresponding iminoethers or iminothioethers, such as lower alkyliminoethers, for example methyl- or ethyl-iminoethers or -iminothioethers, or nitriles, as well as derivatives of the group X in the α-position, especially oxo derivatives thereof, for example acetals or ketals, as well as corresponding thio derivatives, for example with lower alkanols or lower alkanediols, such as methanol, ethanol or ethylene glycol, or imino compounds. The glyoxylic acid lower alkyl esters, as well as the lower alkyl esters of appropriate α-ketocarboxylic acids, for example pyruvic acid, phenylglyoxylic acid or benzylglyoxylic acid, or the nitriles, as well as acetals or ketals thereof, are primarily preferred.

The reaction of compounds of Formulae V and VI can lead to the desired product in one step or via several stages. Thus for example a 4-N-(A)-amino-5-N-(R°-methylene)-amino-pyrimidine, wherein R° denotes a free or reactive, functionally modified carboxyl group, preferably an esterified carboxyl group, such as a carbo-lower alkoxy group, for example carbomethoxy or carbethoxy group, as well as a carbo-phenyl-lower alkoxy group, for example carbobenzyloxy group, or a halogenocarbonyl, for example chlorocarbonyl group, an etherified hydroxyl- or etherified mercapto-carbonimidoyl group, such as a lower alkoxy-carbonimidoyl group, for example methoxy-carbonimidoyl or ethoxy-carbonimidoyl group, as well as a lower alkylmercapto-carbonimidoyl group, for example methyl-mercapto-carbonimidoyl or ethyl-mercapto - carbonimidoyl group, or a nitrile group, can be formed as an intermediate product, which undergoes cyclization to the desired product under the reaction conditions or by treatment with condensation agents which promote cyclization, such as those mentioned below.

The above reaction can be carried out in the absence or preferably in the presence of condensation agents; such agents are primarily metal alcoholates, such as alkali metal, for example sodium or potassium, alkaline earth metal, for example magnesium, or aluminium lower alkanolates, for example methylate, ethylate, n-propylate, isopropylate, n-butylate or tert.-butylate, which are particularly suitable if esters are used as reactive acid derivatives, as well as alkali metals, their hydrides or amides, for example sodium amide or hydride, or organic bases, especially quaternary bases, for example benzyltrimethylammonium hydroxide. At the same time, for example, groupings which can be converted under basic conditions such as acyloxy groups, for example benzoyloxy groups, such as can be present in the pentosidyl radical, can be converted, for example into the free hydroxyl groups. The process can be carried out in the absence or in the presence of diluents or solvents, if necessary with cooling or warming, in a closed vessel and/or in the atmosphere of an inert gas, such as nitrogen.

In resulting compounds with an imino group in the 7-position, this group can be hydrolytically converted into the desired oxo group according to methods which are in themselves known, for example by treatment with an aqueous acid, such as dilute hydrochloric acid. Resulting compounds with a thiono group in the 7-position can also be converted into the corresponding 7-oxo compounds according to methods of hydrolysis which are in themselves known, for example by treatment with an alkaline agent such as an alkali metal hydroxide, in the presence of an oxidizing agent, such as hydrogen peroxide.

Two radicals $R_4$ which can together be converted into an —N= grouping are furthermore, for example, those in which the radical bonded to the pyrimidine nucleus represents a nitroso group and the other represents two hydrogen atoms. Here a catalyst, especially a basic catalyst, for example one of those mentioned above, is preferably used. The reaction is carried out in a suitable manner in an inert solvent and at elevated temperature (compare Pteridine Chemistry, supra, page 65 and thereafter).

The compounds of Formula I can also be obtained if in an appropriate 7-hydroxy-8-A-7,8-dihydro-pteridine the hydroxyl group is oxidized to the oxo group.

The oxidation of a 7-hydroxy-8-A-7,8-dihydro-pteridine to the desired product can be carried out according to oxidation methods which are in themselves known, preferably with the aid of mild oxidizing agents, such as ionic oxidizing agents, for example potassium ferricyanide, or equivalent reagents, such as quinonoid oxidizing agents, but also by means of stronger oxidizing agents, such as potassium permanganate and the like.

In resulting compounds, functionally modified groups can be converted into other groups according to methods which are in themselves known. Inter alia, halogen atoms can be converted into primary amino groups, for example by treatment with ammonia; the primary amino groups can be converted into secondary or tertiary amino groups by substitution (for example by treatment with reactive esters of alcohols of aliphatic character, such as the corresponding halides, for example chlorides, bromides or iodides, or organic sulphonyloxy compounds, for example p-methylphenyl-sulphonyloxy compounds, or with aldehydes or ketones and simultaneous or subsequent reduction, for example with catalytic hydrogen, formic acid or sodium borohydride), or into halogen atoms by diazotization (for example with nitrous acid) followed by treatment with the reagents used in the Sandmeyer reaction (for example treatment with copper-I halides, such as copper-I chloride), or into hydroxyl groups by diazotization followed by boiling with water. Etherified hydroxyl groups can be converted into free hydroxyl groups hydrolytically (for example by treatment with a mineral acid, such as hydrobromic or hydriodic acid), and a benzyloxy group present in the pentosidyl or hexosidyl radical can for example also be converted into the free hydroxyl group hydrogenolytically (for example by treatment with catalytically activated hydrogen) and esterified hydroxyl groups can be converted into free hydroxyl groups hydrolytically (for example by treatment with a suitable base, it also being possible for the saponification of an acylated hydroxyl group to take place under the reaction conditions, for example in the presence of a metal alcoholate); the free hydroxyl groups can be etherified according to methods which are in themselves known (for example by treatment with a diazo compound, such as diazomethane, if necessary in the presence of a catalyst of the Lewis acid type, such as fluoboric acid or aluminium alcoholate), or esterified according to methods which are in themselves known (for example by treatment with etserifying agents such as acid halides, such as chlorides or anhydrides). If necessary, free hydroxyl groups can be transiently protected, for example by etherification with hydrogenolytically removable groups, such as benzyl groups, or esterification with hydrolytically removable groups such as organic carboxylic or sulphonic acids, and be liberated, if desired, after carrying out the reaction, for example hydrogenolytically (such as by treatment with hydrogen in the presence of a metal catalyst such as a palladium catalyst), or hydrolytically (such as by treatment with a suitable basic hydrolysis agent). If required, free mercapto groups can be transiently be protected by hydrogenolytically removable groups, such as benzyl groups, and optionally be liberated hydrogenolytically after carrying out the reaction, for example by treatment with sodium in liquid ammonia.

Depending on the reaction conditions, the new compounds are obtained in the free form or in the form of their salts, especially their acid addition salts; these are also comprised by the present invention. Free compounds and acid addition salts can be converted into one another according to methods which are in themselves known, free compounds for example into their acid addition salts by treatment with acids or suitable ion exchangers and acid addition salts for example into the free compounds by treatment with basic agents or suitable ion exchangers, as well as into other salts, for example with metal salts in suitable solvents or with ion exchangers.

Acid addition salts are preferably pharmaceutically usable non-toxic acid addition salts, such as those with inorganic acids, for example hydrochloric, hydrobromic, sulphuric, phosphoric, nitric or perchloric acid, or with organic acids, such as aliphatic, alicyclic, aromatic or heterocyclic carboxylic or sulphonic acids, for example formic, acetic, propionic, succinic, glycollic, lactic, malic, tartaric, citric, maleic, hydroxymaleic, pyruvic, phenylacetic, benzoic, p-aminobenzoic, anthranilic, p-hydroxybenzoic, salicylic, p-aminosalicylic, embonic, methanesulphonic, ethanesulphonic, hydroxyethanesulphonic, ethylenesulphonic, halogenobenzenesulphonic, toluenesulphonic, naphthalenesulphonic, N-cyclohexyl-sulphamic or sulphanilic acid, methionine, tryptophan, lysine or arginine, as well as ascorbic acid. Salts can optionally be in the form of hemihydrates, monohydrates, sesquihydrates or polyhydrates.

Metal salts can furthermore be converted into the free compounds by reaction with acid agents in a manner which is in itself known, for example with suitable ion exchangers. Free compounds can furthermore be converted into salts, preferably non-toxic, pharmaceutically usable salts, by means of metal oxides or hydroxides, for example those of alkali or alkaline earth metals, as well as by means of ammonia or suitable amines.

The abovementioned salts as well as other salts of the new compounds, for example their picrates, can optionally be used for purifying the resulting free compounds (with the free compound being converted into a salt thereof, the latter being isolated and the free compound again being liberated therefrom) or can be used for characterization. As a result of the close relationships between the new compounds in the free form and in the form of their salts, the free compounds or the salts are, in the preceding and following texts, where appropriate also to be understood to include the corresponding salts or free compounds, as regards sense and purpose.

If desired, a resulting isomer mixture, for example an anomer mixture, can be separated into the individual isomers, for example the $\alpha$- and $\beta$-anomers, according to methods which are in themselves known, for example by means of adsorption and fractional elution (for example by chromatography, such as thin layer chromatography) and/or fractional crystallization. For steric reasons, the formation of the $\beta$-anomer is preferred in many of the above reactions.

The starting substances used according to the invention are known or can, if they are new, be manufactured according to methods which are in themselves known.

The 4-N-(A)-amino-5-amino-pyrimidines used as starting the substances can for example be obtained if in a 5-nitro-4-N-(A)-amino-pyrimidine, wherein the amino group carries a hydrogen atom, the nitro group is reduced to the amino group and, if desired, substituents present are split off or converted into other substituents, for example according to the methods described above. The reduction of the nitro group to the amino group is carried out according to methods which are in themselves known, such as treatment with nascent or catalytically activated hydrogen (for example hydrogen in the presence of Raney nickel) or with a complex metal hydride (for example lithium aluminium hydride). A 4-N-(A)-amino-5-amino-pyrimidine obtainable in this way and used as the starting material can, if desired, without being isolated be reacted with an $\alpha$-X-carboxylic acid or $\alpha$-X-thiocarboxylic acid or a reactive functional derivative thereof (compounds of Formula VI).

The 5-nitro-4-N(A)-amino-pyrimidines used for the manufacture of the above starting substances can for example be obtained if a 4-Am-5-nitro-pyrimidine, wherein Am represents an amino, formylamino or acetylamino group, is reacted, in the absence of a solvent, with an excess of a 1-acyl-, especially 1-acetyl-pentose or -hexose which only possesses protected hydroxyl groups, in the presence of an acid catalyst, such as a non-volatile inorganic acid, a strong organic sulphonic acid or halogenocarboxylic acid, or a metal salt of a strong acid of the Lewis acid type, for example zinc chloride, at normal or reduced pressure and elevated temperature, preferably at 100–200° and, if desired, individual or all protective groups in the sugar radical A in a compound obtainable in this way are removed according to methods which are in themselves known, for example as described above, and/or an anomer mixture is separated into the individual anomers on the basis of the physico-chemical differences, for example by chromatography and/or fractional crystallization. In 5-nitro-4-N-(A)-amino-pyrimidines obtainable in this way substituents, especially functional groups in the pyrimidine radical, can be converted into other substituents, for example according to the above methods, if necessary with simultaneous temporary protection of hydroxyl groups in the pentosidyl radical.

The 7-hydroxy-8-A-7,8-dihydro-pteridines used as starting substances can for example be obtained if a 4-N-(A)-amino-5-amino-pyrimidine, wherein the 4-amino group carries a hydrogen atom, is reacted with a reactive ester of an α-X-ethanol, wherein X primarily represents an oxo group, and the reactive ester is particularly an ester with a hydrohalic acid or a strong organic sulphonic acid, or with an α-X-acetaldehyde or a functional derivative, for example the oxime, thereof, a 7,8-dihydro compound which may be obtained is oxidized (for example with a oxygen in the presence of acids), and the resulting quaternary compound is treated with a base, such as an alkali metal hydroxide.

It is possible, at any suitable stage of a process for the manufacture of the starting substances, to separate resulting anomer mixtures according to methods which are in themselves known.

The invention also comprises those modifications of the present process, according to which an intermediate product obtainable at any stage is used as the starting material and the additional process steps are carried out therewith, as has been described above for the multi-stage process, or in which the process is stopped at any stage. The invention furthermore also comprises those embodiments according to which a starting material is formed under the reaction conditions or is used in the form of a derivative, for example a salt. Thus the O-metallized pteridines can be isolated or also be directly used further for the glycosidation in the form of the reaction mixture obtained.

Preferably, such starting substances are used as lead to the compounds described above as being particularly valuable.

The new compounds can be used in the form of medicines, for example in the form of pharmaceutical preparations in which they are present in the free form or in the form of their salts together with organic or inorganic, solid or liquid, pharmaceutically usable excipients, and which are suitable for enteral, for example oral, or parenteral administration. As excipients, substances are used which are inert towards the new compounds, such as water, gelatine, sugars, for example lactose or glucose, starches, for example wheat starch or maize starch, stearyl alcohol, stearic acid or salts thereof, for example magnesium stearate, talc, vegetable oils, benzyl alcohols, gum, polyalkylene glycols, propylene glycol or other known excipients. The pharmaceutical preparations can be in the solid form, for example as tablets, dragees, capsules or suppositories, or in the liquid form, for example as solutions, suspensions or emulsions. They can be sterilized and/or contain auxiliary substances, such as preservatives, stabilizers, wetting agents or emulsifiers, solubilizing agents, salts for regulating the osmotic pressure or buffers, and also, optionally, other pharmacologically valuable compounds. They are formulated according to methods which are in themselves known.

The new compounds can also be used in veterinary medicine, for example in one of the abovementioned forms, or as an additive to feedstuffs, for example together with the usual diluents and feedstuffs.

The invention is described in more detail in the examples which follow. The preparative layer chromatography carried out on silica gel PF254, containing gypsum (Merck, Darmstadt): Silica gel without the addition of gypsum is used for separating the α- and β-anomers.

EXAMPLE 1

5.4 g. of 2-dimethylamino-7-oxo-7,8-dihydro-pteridine are silylated with 20 ml. of hexamethyldisilazane and one drop of concentrated sulphuric acid, and distilled. The silyl compound is dissolved in 30 ml. of absolute benzene and treated with 2.7 g. of HgO, 4.5 g. of mercury-(II) bromide and a molar amount of freshly manufactured 1-bromo - 2,3,5-tri-O-benzoyl-β-D - ribofuranose (J. Org. Chem. 33, 1806 (1968)) in 36 ml. of absolute benzene. The mixture is heated for 5 hours under reflux with exclusion of moisture. A yellow precipitate already begins to separate out from the almost clear solution after 30 minutes. After 5 hours the mixture is treated with methanol and concentrated by evaporation in a rotary evaporator. The solid residue is extracted with about 200 ml. of chloroform. The chloroform solution is extracted by shaking 3 times with 50 ml. portions of 15% strength aqueous KI solution and once with 50 ml. of water, and is dried over anhydrous calcium sulphate (Sikkon) and concentrated by evaporation in a rotary evaporator. A solid, amorphous, yellow residue is obtained, which melts at 48–60° C. After recrystallization from ethanol with the addition of neutral aluminium oxide (Woelm, neutral) 8-(2',3',5'-tri - O - benzoyl-1-β-D-ribofuranosidyl)-2-dimethylamino-7-oxo-7,8-dihydro-pteridine of formula

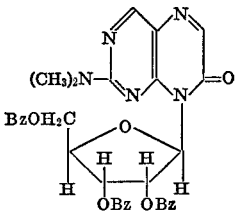

is obtained in the form of chromatographically pure light yellow needles of melting point 173–177° C. In the above formula, Bz represents the benzoyl radical.

About 50 mg. of sodium are dissolved in 50 ml. of absolute methanol and 1 g. of 8-(2',3',5-tri-O-benzoyl-1-β-D-ribofuranosidyl) - 2 - dimethylamino-7-oxo-7,8-dihydro-pteridine is then suspended in the solution. The mixture is stirred for 16 hours at room temperature with exclusion of moisture. After about 2 hours, the starting substance has dissolved, and after about 3 hours a colorless precipitate begins to separate out. After 16 hours the product is filtered off, washed with methanol and dried at 100° C. After recrystallization from 25 ml. of ethanol/3 ml. of water chromatographically pure 8-(1-β-D-ribofuranosidyl) - 2 - dimethylamino-7-oxo-7,8-dihydro-pteridine is obtained in the form of yellow needles of melting point 195–198° C.

EXAMPLE 2

5.4 g. of 2-dimethylamino-7-oxo-7,8-dihydro-pteridine are heated under reflux with 20 ml. of hexamethyldisilazane and one drop of concentrated sulphuric acid as the catalyst at 150–160° C. in an oil bath, with stirring and exclusion of moisture. After 1 hour the starting substance has completely dissolved. After 16 hours the excess hexamethyldisilazane is removed, initially at 160° C. under normal pressure and then at 30° C. in a waterpump vacuum. The solid residue is distilled in an oil pump vacuum at 180° C. oil bath temperature. The silyl compound is obtained in the form of light yellow crystals.

6.0 g. of the silyl compound are dissolved in about 100 ml. of absolute benzene, mixed with 5.4 g. of acetobromoglucose, 2.7 g. of HgO and 4.5 g. of mercury-(II) bromide, and heated for 4 hours under reflux, with exclusion of moisture. The mixture is treated with about 20 ml. of methanol and evaporated to dryness in a rotary evaporator. The residue is extracted with about 200 ml. of chloroform. The chloroform solution is extracted by shaking 3 times with 50 ml. portions of 15% strength aqueous KI solution and once with 100 ml. of water, dried over anhydrous calcium sulphate (Sikkon) and evaporated to dryness. A solid, amorphous, yellow residue is obtained which melts at 60–80° C. After recrystallization from ethanol with the addition of 1 g. of neutral aluminium oxide (Woelm, neutral) 8-(2′,3′,4′,6′-tetra - O - acetyl - 1-β-D-glucopyranosidyl)-2-dimethylamino-7-oxo-7,8-dihydro-pteridine of melting point 177–186° C. and of formula

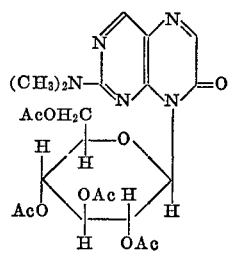

is obtained, where Ac represents the acetyl radical. 2-dimethylamino - 7 - oxo-8-(1-β-D-glucopyranosidyl)-7,8-dihydropteridine is obtained therefrom by desacetylation.

8-(1 - β-D - ribofuranosidyl)-2-dimethylamino-4-methoxy-7-oxo-7,8-dihydro-pteridine, which after sintering from 171° C. onwards melts at 175° C., is obtained analogously with subsequent hydrolysis, in the form of slightly yellowish crystals;

$$[\alpha]_{578}^{20} = -7°,$$

$[\alpha]_{546}^{20} = -6°$ and $[\alpha]_{436}^{20} = +7°$ (c.=0.5 in absolute methanol); NMR spectrum in deuterodimethylsulphoxide/trimethylsilane: δ (H 1 in the ribofuranosidyl radical)=6.74, doublet with J=3.5 Hz.

EXAMPLE 3

4.4 g. of 7-oxo-7,8-dihydro-pteridine are silylated with 20 ml. of hexamethyldisilazane and a drop of concentrated sulphuric acid. After 5 hours excess hexamethyldisilazane is distilled off and the residue is distilled as a light yellow syrup at 160° C. and 0.3 mm. Hg.

The resulting silyl compound is mixed with 6.5 g. of mercury-(II) oxide, 11 g. of mercury-(II) bromide and 12.3 g. of acetobromoglucose, after which 70 ml. of absolute benzene are added and the mixture is heated under reflux. After about 1 hour a viscous syrupy sediment forms, which does not dissolve even on prolonged heating. The solution turns dark brown. After 5 hours the mixture is worked up, whereupon a brown powder is obtained.

In a second experiment, 2.4 g. of 7-oxo-7,8-dihydro-pteridine are silylated. The silyl compound is dissolved in absolute benzene, 5.6 g. of mercury-(II) bromide and 3.4 g. of mercury-(II) oxide are suspended therein, 6.5 g. of acetobromoglucose dissolved in absolute benzene are added and the mixture is heated under reflux. Here again a syrup forms after 1 hour, which is not dissolved by adding absolute benzene, toluene or chloroform. After 1 hour the reaction is stopped and the resulting mixture is worked up, whereby a light brown powder is obtained.

The two crude products are conjointly purified over silica gel plates with benzene/chloroform/acetone, 5:4:1, as the running agent.

A crude product is obtained, which is recrystallized from ethanol and which yields 7-oxo-8-(2′,3′,4′,6′-tetra-O-acetyl - 1-β-D-glucopyranosidyl)-7,8-dihydro-pteridine of formula

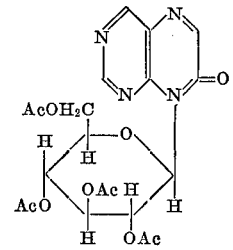

in the form of yellowish crystals which melt at 180–182° C. 7 - oxo - 8 - (1-β-D-glucopyranosidyl)-7,8-dihydropteridine is obtained therefrom by desacetylation.

EXAMPLE 4

3 g. of 7-oxo-7,8-dihydro-pteridine are heated for 12 hours at 150–160° C. under reflux with 15 ml. of hexamethyldisilazane and a drop of concentrated sulphuric acid, with exclusion of moisture. Excess hexamethyldisilazane is distilled off and the residue is distilled at 0.3 mm. Hg and 160° C., whereupon a light yellow syrup is obtained which crystallizes on prolonged standing.

The resulting silyl compound is dissolved in a little absolute benzene and mixed with 7.2 g. of mercury-(II) bromide, 4.4 g. of mercury-(II) oxide and a molar amount of 1-bromo-2, 3,5-tri-O-benzoyl-ribose in 120 ml. of absolute benzene. The mixture is heated for 5 hours under reflux and worked up in the usual manner: it is mixed with methanol, concentrated by evaporation in a rotary evaporator, the residue taken up in chloroform, insoluble matter filtered off, and the material extracted by shaking with potassium iodide solution and water, dried and concentrated by evaporation in a rotary evaporator, whereupon a brown amorphous powder is obtained.

The resulting product is purified by preparative layer chromatography on silica gel (Pf$_{254}$ of Merck) using carbon tetrachloride/acetone, 9:1, as the running agent, whereupon a chromatographically pure colorless amorphous product is obtained. After recrystallization from ethanol, 7-oxo-8-(2′,3′,5′-tri-O-benzoyl-1-β-D-ribofuranosidyl)-7,8-dihydro-pteridine of formula

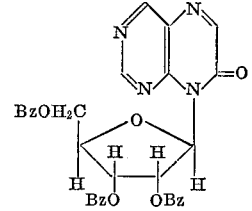

wherein Bz represents benzoyl, is obtained, melting at 78–90° C. 7 oxo - 8 - (1-β-D-ribofuranosidyl)-7,8-dihydro-pteridine is obtained therefrom by debenzoylation.

EXAMPLE 5

3.8 g. of 2-dimethylamino-7-oxo-7,8-dihydro-pteridine are silylated in 20 ml. of hexamethyldisilazane with a drop of concentrated sulphuric acid as usual, and the product is distilled. The resulting silyl compound is heated under reflux with 7.2 g. of mercury-(II) bromide, 4.4 g. of mercury-(II) oxide and 8.3 g. of 3,5-di-p-chlorobenzoyl-2-desoxy-D-ribofuranosidyl chloride (manufactured according to the instruction of J. J. Fox et al., J. Amer. Chem. Soc. 83, 4066, 1961) in 150 ml. of absolute benzene, with exclusion of moisture. After about 10 minutes the solution is clear and after 30 minutes a thick light yellow precipitate separates out. After 5 hours methanol is added, the mixture is concentrated by evaporation in a rotary evaporator, the residue is taken up in chloroform and insoluble matter is filtered off. The chloroform solution is extracted by shaking 3 times with 30 ml. of 15% strength aqueous potassium iodide solution and once with water, dried over anhydrous calcium sulphate (Sikkon) and concentrated by evaporation in a rotary evaporator. Hereupon a solid amorphous yellow residue is obtained.

The purification of the resulting residue takes place on silica gel plates (silica gel Pf$_{254}$ of Merck) with benzene/chloroform/acetone, 5:4:1, as the running agent. 3 developments are carried out. The appropriate zone is eluted with acetone and the eluate is concentrated by evaporation in a rotary evaporator, whereupon an amorphous light yellow product of melting point 60–70° C. is obtained. After recrystallization, 2-dimethylamino-7-oxo-8-(3',5' - di-O-p-chlorobenzoyl - 1-β-D-2'-desoxyribofuranosidyl)-7,8-dihydro-pteridine of formula

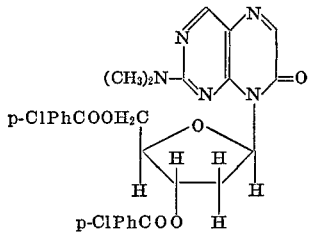

wherein p-ClPh represents p-chlorophenyl, is obtained in the form of light yellow needles, melting point 81–93° C.

20 mg. of sodium are dissolved in 20 ml. of absolute methanol and 500 mg. of the amorphous 2-dimethylamino-7-oxo-8-(3',5'-di - O - p - chlorobenzoyl-1-β-D-2'-desoxyribofuranosidyl) - 7,8 - dihydro-pteridine are suspended therein. The mixture is stirred for 5½ hours at 20° C. with exclusion of moisture. After addition of water, it is neutralized with Dowex 50 (H+ form) and concentrated by evaporation in a rotary evaporator until a syrup is obtained. After addition of ether, the residue obtained crystallizes. After recrystallization from ethanol, 2-dimethylamino-7-oxo - 8 - (1 - β - D - 2' - desoxyribofuranosidyl)-7,8-dihydro-pteridine is obtained in the form of light yellow needles of melting point 172–174° C.

EXAMPLE 6

A methanol solution of 5-amino-4-N-(2',3',5'-tri-O-benzoyl-1-D-ribofuranosidyl)-amino - 2 - dimethylamino-6-methoxy-pyrimidine manufactured according to the process described below, is mixed with 0.3 g. of the ethyl-semiacetal of glyoxylic acid ethyl ester. The yellow solution is briefly warmed and then left to stand for 2 hours. After concentration by evaporation under reduced pressure, the residue is twice evaporated to dryness with benzene. The residue is taken up in 50 ml. of methanol, mixed with 0.75 ml. of a 1 molar solution of sodium methylate in methanol, and the mixture heated for 1½ hours at 60° C. The reaction mixture is concentrated by evaporation in a rotary evaporator under reduced pressure, and the residue is taken up in a little methanol, applied to 2 plates with a layer of silica gel (20 x 40 x 0.2 cm.) for preparative layer chromatography, and separated by development with acetic acid ethyl ester and with 97:3, 94:6 and 90:10 mixtures of acetic acid ethyl ester:methanol. A yellow product is eluted from the zones 5.3–9.6 cm. (intense blue fluorescence at 365 mμ) with a mixture of chloroform and methanol, and is recrystallized from 3 ml. of ethanol using an active charcoal preparation. After cooling, 8-(1-D-ribofuranosidyl)-2-dimethylamino-4-methoxy-7-oxo-7,8-dihydro-pteridine of formula

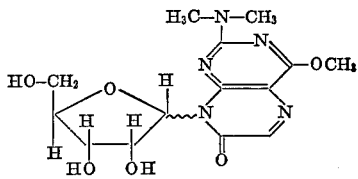

which after sintering melts at 170–175° C., is obtained as a light yellow product. After renewed recrystallization from 1 ml. of methanol and 2 ml. of ethanol, the product is obtained in a slightly yellowish form, which melts at 170–175° C. (sintering from 160° C. onwards), solidifies, and melts at 200–204° C. with decomposition: $[\alpha]_{578}^{25}=+54.2°$ and $[\alpha]_{546}^{25}=+64.5°$ (c.=1.33 in absolute methanol). The anomer mixture obtainable in this way can be separated into the α- and β-anomers, for example by thin layer chromatography.

The starting material can be manufactured as follows:

A mixture of 19.9 g. of 4-amino-2-dimethylamino-5-nitro-6-oxo-1,6-dihydro-pyrimidine in 400 ml. of dimethylformamide is stirred for 30 minutes with 13.8 g. of anhydrous potassium carbonate. 20 g. of methyl iodide are then added and the mixture is warmed for one hour while stirring (intensive condenser, calcium chloride tube). After being left to stand for 18 hours at room temperature, the suspension is extensively concentrated by evaporation under reduced pressure (bath temperature≤60° C.). The residue is triturated with 100 ml. of water, cooled and filtered and then washed with a total of 60 ml. of 1.5% strength ammonia in 3 portions and thereafter with 30 ml. of water. After drying at 100° C., a yellow product is obtained which is dissolved in 180 ml. of dimethylformamide with warming. The solution is treated with active charcoal, filtered, and the residue rinsed with 30 ml. of hot dimethylformamide. The filtrate is warmed and slowly treated with 870 ml. of hot water until a cloudiness persists. After leaving to stand while cooling, and filtering, the product is washed with water and dried at 100° C.; 4 - amino - 2 - dimethylamino-6-methoxy-5-nitro-pyrimidine is obtained in the form of yellow small crystals, melting point 192–193° C.

6.93 g. of 4-amino-2-dimethylamino-6-methoxy-5-nitro-pyrimidine are melted together with 16.68 g. of 1-O-acetyl-2,3,5-tri-O-benzoyl-β-D-ribofuranose for 5 minutes at a temperature of 160 C.±4° C., while stirring. 1.1 g. of zinc chloride (anhydrous) are then added and the mixture is kept at this temperature for 40 minutes while stirring; during the entire time, a weak stream of nitrogen is passed over the melt.

The reaction mixture, while still warm, is repeatedly extracted with acetic acid ethyl ester; the combined organic extracts are concentrated by evaporation under reduced pressure and the residue is taken up in a little chloroform. The solution is applied to 5 plates with silica gel (100 x 20 x 0.2 cm.) and developed in solvent mixtures of carbon tetrachloride and tetrahydrofuran (97:3; 96:4; 95:5; 94:6; 93:7; 92:8; 91:9 and 90:10).

Extraction with acetic acid ethyl ester from zones 11.0–13.0 cm.; 10.7–12.5 cm.; 10.5–12.3 cm.; 10.7–12.6 cm.; and 10.6–12.5 cm. yields 4-N-(2,3,5-tri-O-benzoyl-1-α-D-ribofuranosidyl)-amino - 2 - dimethylamino - 6 - methoxy-5-nitro-pyrimidine as a yellow product which after recrystallization from methanol and slight sintering melts at 76–80° C.; $[\alpha]_{578}^{21}=+8.8°$ and $[\alpha]_{546}^{21}=+7.7°$ (c.=1.15 in absolute chloroform).

Extraction with acetic acid ethyl ester from zones 8.5–10.3 cm.; 8.3–10.0 cm.; 8.9–9.8 cm.; 8.0–9.8 cm.; and 8.2–9.8 cm. yields 4-N-(2,3,5-tri-O-benzoyl-1-β-D-ribofuranosidyl)-amino - 2 - dimethylamino - 6 - methoxy-5-nitro-pyrimidine as a yellow syrup which after crystallization from methanol and after sintering melts at 78–85° C; $[\alpha]_{578}^{21}=-7.1°$ and $[\alpha]_{546}^{21}=-12.0°$ (c.=1.15 in absolute chloroform).

The anomer mixture can be isolated from the appropriate intermediate zones.

A mixture of 0.5 g. of 4-N-(2,3,5-tri-O-benzoyl-1-β-D-ribofuranosidyl)-amino - 2 - dimethylamino-6-methoxy-5-nitro-pyrimidine in 15 ml. of acetic acid ethyl ester and 25 ml. of methanol is hydrogenated for 22 hours at room temperature in the presence of 6 g. of Raney nickel. The colorless solution is rapidly freed of the catalyst by suction filtration, the latter is rinsed with methanol, and the filtrate, containing a mixture of the two anomers of 2-dimethylamino-5-amino - 6 - methoxy - 4-N-(2',3',5'-tri-O-benzoyl - 1 - D - ribofuranosidyl)-amino-pyrimidine, is directly used further.

EXAMPLE 7

A mixture of 6.57 g. of 4-N-(2',3',5'-tri-O-benzoyl-1-α-D-ribofuranosidyl) - amino-2-dimethylamino-6-methoxy-5-nitropyrimidine in 50 ml. of dry acetic acid ethyl ester and 50 ml. of absolute methonal is hydrogenated for 4¾ hours at room temperature and in the presence of 40 g. of Raney nickel. The reaction mixture, containing 5-amino-4-N - (2',3',5' - tri - O - benzoyl-1-D-ribofuranosidyl) - amino-2-dimethylamino-6-methoxy-pyrimidine, is freed of catalyst by suction filtration, with the filtrate being collected in a receiver containing 2.25 g. of glyoxylic acid ethyl ester semiacetal. The catalyst is rinsed hot with 100 ml. of absolute acetic acid ethyl ester and 100 ml. of absolute methanol and the filtrate is left to stand for 16 hours. It is then concentrated by evaporation under reduced pressure and the residue is repeatedly evaporated to dryness with benzene and toluene, subsequently heated under a high vacuum up to a bath temperature of 70° C., and dissolved in 120 ml. of absolute methanol with warming.

The solution is mixed with 1.23 g. of potassium tert.-butylate and the mixture is oiled for 5 minutes under reflux, then neutralized with glacial acetic acid and concentrated by evaporation under reduced pressure. The residue is further evaporated to dryness three times with a mixture of 30 ml. of ethanol and 20 ml. of water in each case and is then dissolved in about 20 ml. of the methanol-water mixture. After standing for several days at room temperature, the solution is left to stand refrigerated for 6 hours, and the precipitate is filtered off, rinsed with ethanol and acetone and dried over phosphorus pentoxide and solid potassium hydroxide under reduced pressure. The light yellow anomer mixture of 8-(1-D-ribofuranosidyl) - 2 - dimethylamino - 4 - methoxy - 7-oxo - 7,8 - dihydro-pteridine thus obtained melts, after sintering from 120° C. onwards, at 148–160° C.; the product is identical with the compound described in Example 6.

A solution of 1.6 g. of the anomer mixture of 8-(1-D-ribofuranosidyl) - 2 - dimethylamino - 4 - methoxy - 7-oxo - 7,8 - dihydro-pteridine in 32 ml. of ethanol (99.5%) is kept refrigerated and the precipitate is filtered off, washed with about 7 ml. of an ice-cold mixture of ethanol and acetone, and the product dried at room temperature under reduced pressure. 8 - (1 - β - D - ribofuranosidyl)-2-dimethylamino - 4 - methoxy - 7 - oxo - 7,8 - dihydro-pteridine is thus obtainable as slightly yellowish crystals, identical with the compound described in Example 2.

The filtrate obtained after the above recrystallization is concentrated by evaporation under reduced pressure and the syrupy residue is dissolved in 6 ml. of ethanol (99.5% strength) with warming and diluted with 14 ml. of dry acetic acid ethyl ester while still warm. After seeding, the mixture is kept refrigerated and the precipitate is filtered off, washed with a little acetic acid ethyl ester and dried at room temperature under reduced pressure. The 8-(1-α-D-ribofuranosidyl) - 2 - dimethylamino - 4-methoxy - 7 - oxo - 7,8 - dihydro-pteridine which is thus obtainable in a light yellow crystalline form melts, after sintering from 124° C. onwards, at 129–131° C.; $[\alpha]_{578}^{20}=+156°$, $[\alpha]_{546}^{20}=+185°$ and $[\alpha]_{436}^{20}=+452°$ (c.=0.5 in absolute methanol); NMR spectrum in deuterodimethylsulphoxide/trimethylsilane: δ (H 1 in the ribofuranosidyl radical)=7.19, doublet with J=6.5 Hz.

EXAMPLE 8

A mixture of 0.63 g. of the anomer mixture of 4-N-(2',3',5' - tri - O - benzoyl - 1 - D - ribofuranosidyl)-amino - 2 - dimethylamino - 5 - nitro - pyrimidine in 20 ml. of absolute acetic acid ethyl ester and 10 ml. of absolute methanol is hydrogenated for 3 hours at room temperature in the presence of 4 g. of Raney nickel. The colorless reaction mixture, containing the anomer mixture of 5 - amino - 4 - N - (2',3',5' - tri - O - benzoyl-1 - D - ribofuranosidyl)-amino - 2 - dimethylamino-pyrimidine, is rapidly filtered into a receiver containing 0.25 g. of the ethyl semiacetal of glyoxylic acid ethyl ester and the filter residue is rinsed with 50 ml. of absolute acetic acid ethyl ester and 20 ml. of absolute methanol. The yellow filtrate is warmed slightly and is then left to stand for some hours and concentrated by evaporation under reduced pressure, finally under a high vacuum for 10 minutes at 70° C. The residual solid material is dissolved in 30 ml. of absolute methanol, mixed with 0.12 g. of potassium tert.-butylate and boiled for 2 hours under reflux. The solution is neutralized with acetic acid, concentrated by evaporation under reduced pressure and evaporated under reduced pressure to dryness three times with 20 ml. of a 1:1 mixture of ethanol and water. The residue is taken up in a small amount of ethanol and diluted with water. A brownish-yellow product is obtained in 2 fractions and is recrystallized from 10 ml. of water with the addition of active charcoal and cellulose. The 8-(1-D-ribofuranosidyl) - 2 - dimethylamino - 7 - oxo - 7,8 - dihydro-pteridine of formula

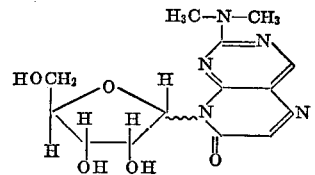

thus obtained in the form of yellow-brown crystals melts at 189–192° C.

The starting material can be manufactured as follows:

A mixture of 1.83 g. (0.01 mol) of 4-amino-2-dimethylamino - 5 - nitro-pyrimidine and 5.56 g. (0.011 mol) of 1-O-acetyl - 2,3,5 - tri - O - benzoyl - β - D - ribofuranose is melted together over the course of 5 minutes at a bath temperature of 160° C., then mixed with 0.5 g. of zinc-II chloride, and the melt stirred for 35 minutes at 160° C. The residue is extracted by boiling with 50 ml. of chloroform and 50 ml. of acetic acid ethyl ester, and the mixture is filtered; the filtrate is concentrated by evaporation under reduced pressure and the residue is taken up in a little chloroform. The solution is applied to 4 thick layer plates (40 x 20 x 0.25 cm.) and developed four times with a 95:5 mixture of benzene and acetone. The anomer mixture of 4-N-(2,3,5 - tri - O - benzoyl - 1 - D - ribofuranosidyl) - amino - 2 - dimethylamino - 5 - nitro - pyrimidine is obtained from the 12.1–14.7 cm. zone, while a product still containing starting material is obtained from the 9.4–12.1 cm. zone. The latter is suspended in 3 ml. of chloroform and filtered; the filtrate is applied to a thick layer plate (40 x 20 x 0.25 cm.) and developed with 95:5, 94:6, 93:7, 92:8, 91:9 and 90:10 mixtures, and a further quantity of the anomer mixture of 4-N-(2',3',5'-tri - O - benzoyl - 1 - D - riboforanosidyl)-amino - 2 - dimethyl-amino-5-nitro-pyrimidine is obtained.

EXAMPLE 9

1-O-acetyl - 2,3,5 - tri - O - benzoyl-β-D-ribofuranose (32.4 g.) is converted in the usual way into 1-bromo-2,3,5-tri-O-benzoyl-ribofuranose. After evaporation, the halogen sugar is dissolved in 50 ml. of absolute acetonitrile, 2-tri-methylsilylamino - 4 - dimethylamino - 7 - trimethylsilyloxy-pteridin (22.5 g.) diluted with a further 100 ml. of absolute acetonitrile is added and the reaction mixture is stirred intensively for 20 hours at 25° C. Subsequently 65 ml. of methanol is added and the precipitate that forms filtered with suction. On concentration by evaporation, the filtrate yields a crude product which is taken up in 120 ml. of chloroform and applied to 6 silica gel plates (100 x 20 x 0.2 cms.). After 6 hours continuous development with chloroform/ethyl acetate (95:5), two intensively blue fluorescent zones are obtained. The two zones are separated, and eluted with ethyl acetate, with the α-riboside being obtained from the more slowly moving zone and the β-riboside from the more quickly moving zone after concentration by evaporation. The amorphous 2-amino - 4 - dimethylamino - 7 - oxo - 7,8 - dihydro - 8- (1 - α - D - 2,3,5 - tri - O - benzoyl - ribofuranosidyl)-pteridin has a melting point of 79–82° C.

2-amino-4-dimethylamino - 7 - oxo-7,8-dihydro-8-(1-α-D - 2,3,5 - tri - O - benzoyl - ribofuranosidyl)-peteridin (1.165 g.) is dissolved in 50 ml. of warm absolute methanol and after cooling is treated with 9 ml. of a 0.02 m-methanolic sodium methylate solution. The mixture is stirred for 4 hours at 25° C., the solvent is stripped off in vacuo, the residue treated with 5 ml. of methanol and 10 ml. of absolute benzene and evaporated. This process is repeated once more. The residue is recrystallized from absolute methanol, with the 2-amino-4-dimethylamino-7-oxo-7,8-dihydro-8-(1-α - D - ribofuranosidyl)-pteridin of formula

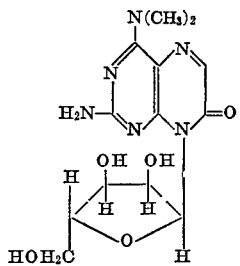

being obtained in the form of yellowish crystals, which melt at 203° C. (with decomposition).

EXAMPLE 10

2 - methylmercapto - 4 - dimethylamino - 7 - oxo-7,8-dihydro - pteridin (0.91 g.) is heated for 12 hours under reflux in 10 ml. of hexamethyldisilazane. The excess hexamethyldisilazane is stripped off in a water-pump vacuum and the residue distilled under a high vacuum at a bath temperature of 200° C., when a colorless oil is obtained. 0.382 g. of this trimethylsilyl compound is fused with 0.7 g. of 1 - O - acetyl - 2,3,5-tri - O - benzoyl - β - D - ribofuranose in a 10 ml. flask fitted with a drying tube at 140° C. 43 mg. of zinc-II-chloride are added and heating at 140° is continued for two more hours with stirring. The melt is dissolved in 20 ml. of chloroform and applied to two silica gel plates (40 x 20 x 0.2 cms.). The plate is developed twice with chloroform and once with chloroform/ethyl acetate (95:5). The broad zone is eluted with ethyl acetate and concentrated by evaporation to dryness, when the 2-methylmercapto-4-dimethylamino - 7 - oxo-7,8-dihydro-8-(1-β-D-2,3,5-tri-O-benzoyl - ribofuranosidyl) - pteridin of formula

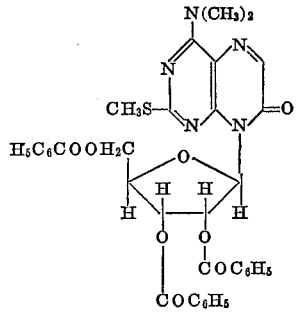

is obtained in the form of a colorless amorphous powder.

EXAMPLE 11

2 - methylmercapto - 4 - amino - 6 - methoxycarbonyl-7-oxo-7,8-dihydropteridin (0.534 g.) is heated for 20 hours under reflux with 10 ml. of hexamethyldisilazane. After approx. 10 hours the solution has become clear. On completion of the reaction, the excess hexamethyldisilazane is stripped off in vacuo at a bath temperature of 100° C. and a high vacuum introduced thereafter for a further 5 minutes. The residue is dissolved in 60 ml. of dry acetonitrile, and firstly 1 g. of 1-acetyl-2,3,5-tri-O-benzoyl-β-D-ribofuranose is added, then 0.16 ml. of tin tetrachloride. The mixture is subsequently stirred for 3 hours at 25° C., then neutralized with methanolic ammonia and evaporated to dryness in vacuo. The residue is treated with 20 ml. of chloroform, the undissolved matter is filtered off and the filtrate, after it has been concentrated by evaporation to 10 ccm., is applied to 3 preparative silica gel plates (Merck Pf₂₅₄) measuring 40 x 20 cms. The plate is developed with chloroform/acetone (92.5:7.5) over the total length of the plate. The desired product is present in the first broad zone after the start. It is eluted with acetone, the solvent is stripped off and the residue recrystallized from 25 ml. of methanol. The 2-methylmercapto-4-amino - 6 - methoxycarbonyl-7-oxo - 7,8 - dihydro - 8 - (1-β-D-2,3,5-tri-O-benzoyl-ribofuranosidyl)-pteridine is thus obtained in the form of yellow crystal needles (M.P. 102–110° C.).

2-methylmercapto - 4 - amino - 6 - methoxycarbonyl-7-oxo - 7,8 - dihydro - 8 - (1 - β - D - 2,3,5 - tri-O-benzoyl-ribofuranosidyl)-pteridin (1.092 g.) is added to a solution of 160 mg. of sodium in 100 ml. of absolute methanol and stirred for 2 hours at 25° C. The reaction mixture is brought to pH 6 with acetic acid, concentrated to dryness by evaporation in a rotary evaporator, and the process is repeated three more times with methanol/water (2:1) in order to remove the benzoic acid ester. The residue is recrystallized from water, and 2-methylmercapto-4-amino - 6 - methoxycarbonyl - 7 - oxo - 7,8-dihydro - 8 - ( 1 - β - D - ribofuranosidyl)-pteridin of formula

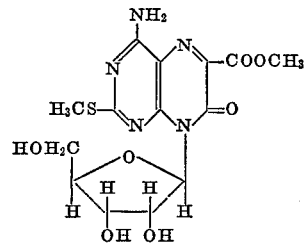

is obtained in the form of yellow crystals, which melt at 144–146° C.

EXAMPLE 12

2 - methylmercapto - 4 - amino - 6 - ethoxycarbonyl-7-oxo - 7,8 - dihydro - pteridin (0.562 g.) is heated for 12 hours under reflux in 5 ml. of hexamethyldisilazane with addition of a few crystals of ammonium sulphate. The excess hexamethyldisilazane is stripped off in a water-pump vacuum and the residue distilled under a high vacuum at 220–230° C./0.05 mm. Hg. 0.645 g. of the di-trimethylsilyl compound thus obtained is fused with 0.845 g. of 1 - O - acetyl - 2,3,5 - tri - O - benzoyl - β-D-ribofuranose for five minutes at 140° C. in a 10 ml. round flask fitted with a drying tube. Zinc-II-chloride (50 mg.) is then added and the mixture heated for 50 minutes, with stirring, at 130–140° C. The heat treatment is continued thereafter for a further 10 minutes in a water-pump vacuum. The melt is allowed to cool, dissolved in 8 ml.

of chloroform and applied to 2 silica gel plates (40 x 20 cms.). The plates are developed once with chloroform/acetone (95:5 or 9:1), when three zones are obtained, of which the center one (7–11 cms.) contains the desired product. After elution and concentration by evaporation, the residue is recrystallized from n-propanol and the 2-methylmercapto - 4 - amino - 6 - ethoxycarbonyl-7-oxo-7,8 - dihydro - 8 - (1 - β - D - 2,3,5-tri-O-benzoyl-ribofuranosidyl)-pteridin of formula

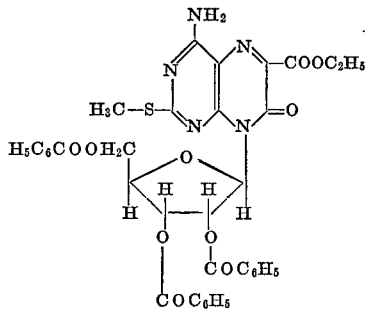

is thus obtained in the form of yellow crystals resembling cotton wool (M.P. 106° C.).

EXAMPLE 13

2-amino - 4 - dimethylamino-7-oxo-7,8-dihydro-pteridin (7.61 g.) is heated for 96 hours under reflux in 60 ml. of hexamethyldisilazane. The excess hexamethyldisilazane is stripped off in vacuo at 100° C. and the residue distilled under a high vacuum at a bath temperature up to 220° C. A yellow oil having a boiling point of 141–150° C./10⁻⁴ mm. Hg is thus obtained initially which congeals at ambient temperature (M.P. 110–115° C.). 12.28 g. of this bis-trimethylsilyl compound is introduced into 40 ml. of absolute benzene and then mixed with 1-bromo-2,3,5-tri-O-benzoyl-β-D-ribofuranose (prepared from 17.67 g. of 1 - O-acetyl-2,3,5-tri-O-benzoyl-β-D-ribofuranose) in 45 ml. of absolute benzene. Mercury-(II)-oxide (3.8 g.) and mercury-(II)-bromide (6.28 g.) are added and the mixture is heated for 10 hours under reflux. After completion of the reaction, 50 ml. of methanol is added and the precipitate that has separated is filtered with suction. It is washed three times with 50 ml. of chloroform each time, the organic filtrates are combined, concentrated by evaporation to dryness and the residue taken up in 250 ml. of chloroform. The chloroform phase is extracted four times by shaking with 50 ml. each time of a 15% strength potassium iodide solution and subsequently one more time with 50 ml. of water. The chloroform layer is dried over sodium sulphate and evaporated to dryness. The resulting substance mixture is separated by way of silica gel plates (100 x 20 x 0.2 cms.), with 2 g. of crude product being applied in each case. Continuous development with chloroform/ethyl acetate (95:5) over a period of 6 hours is carried out. The principal zone is repeatedly eluted with ethyl acetate and then concentrated to dryness, when the 2-amino-4-dimethylamino - 7 - oxo-7,8-dihydro-8-(1-β-D-2,3,5 - tri-O-benzoyl-ribofuranosidyl)-pteridin is obtained in the form of a yellowish amorphous product that melts at 93–99° C.

5.4 g. of 2-amino-4-dimethylamino-7-oxo-7,8-dihydro-8 - (1-β-D-2,3,5-tri-O-benzoyl-ribofuranosidyl)-pteridin is dissolved, with heating, in 370 ml. of absolute methanol. After the solution has cooled to 25° C., 40 ml. of a 0.02 molar sodium methylate solution is added and the mixture is stirred for 12 hours, then cooled for 16 hours to —20° C. in order to effect completion of the precipitate. The precipitate is collected by suction filtration and recrystallized from methanol, when the 2-amino-4-dimethylamino-7-oxo-7,8-dihydro-8-(1 - β-D-ribofuranosidyl)-pteridin of formula

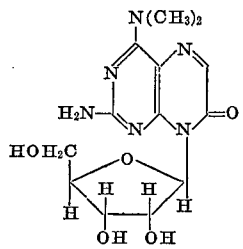

is obtained in the form of yellowish crystals which melt at 233° C. (with decomposition).

EXAMPLE 14

4 - dimethylamino-7-oxo-7,8-dihydro-pteridin (95 mg.) is heated for 12 hours under reflux in 3 ml. of hexamethyldisilazane with addition of a few crystals of ammonium sulphate. The excess hexamethyldisilazane is stripped off in a water-pump vacuum at a bath temperature of up to 100° C. The resulting residue is fused with 1-O-acetyl-2,3,5 - tri-O-benzoyl-β-D-ribofuranose (0.25 g.) for five minutes at 140° C. Zinc-II-chloride (20 mg.) is added and the mixture heated, with stirring, for a further 5 hours to 140° C. and for 1 hour to 160° C. The dark melt is dissolved in 10 ml. of chloroform, filtered, concentrated to 5 ml. and then applied to a silica gel plate (20 x 20 cms.). The plate is developed twice with chloroform and once with chloroform/ethyl acetate (95:5). The broad zone is eluted with ethyl acetate and then concentrated to dryness, the 4-dimethylamino - 7 - oxo-7,8-dihydro-8-(1-β-D-2,3,5-tri-O-benzoyl-ribofuranosidyl)-pteridin of formula

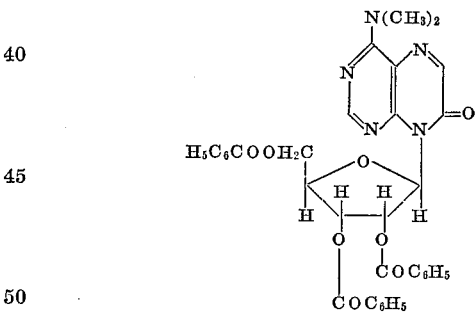

being obtained in the form of a colorless, amorphous product.

EXAMPLE 15

2-benzylmercapto - 4 - amino-6-ethoxycarbonyl-7-oxo-7,8-dihydro-pteridin (2.46 g.) is heated under reflux for 36 hours with 20 ml. of hexamethyldisilazane and addition of a few crystals of ammonium sulphate. The excess hexamethyldisilazane is stripped off in a water-pump vacuum and the residue distilled under a high vacuum at a bath temperature of 240° C., when a yellow oil having a boiling point of 226° C./10⁻³ mm. Hg is obtained. 2.85 g. of this bis-trimethylsilyl compound is fused with 1-O-acetyl-2,3,5-tri-O-benzoyl-β-D-ribofuranose (4 g.) for 5 minutes at 140° C. in a 25 ml. round flask fitted with a drying tube. Zinc-II-chloride (0.135 g.) is subsequently added and the mixture heated, with stirring, for 2 hours to 140° C. Upon cooling, the melt is dissolved in 20 ml. of chloroform and poured onto a silica gel column (100 x 3 cms.). The column is developed first with chloroform/ethyl acetate (9:1), when the by-products are washed out. The desired product is obtained by elution with chloroform/acetone and increasing gradient from 95:5→to 80:20. The uniformity of the zone is verified by thin layer chromatography. The eluate is concentrated in vacuo and the residue recrystallized from n-propanol with addition of some activated charcoal. The 2-benzylmercapto-4-amino-6-ethoxycarbonyl-7-oxo-7,8-dihydro - 8 - (1 - β-D-2,3,5-tri-O-benzoyl-ribofuranosidyl)-pteridin of formula

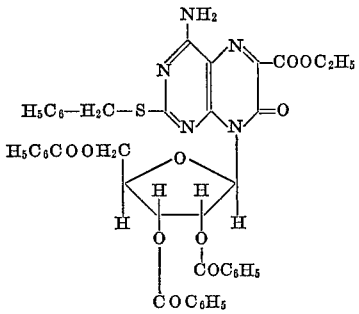

is thus obtained in the form of yellowish crystals, which melt at 187–188° C.

EXAMPLE 16

4-amino-7-oxo-7,8-dihydro-pteridin (0.63 g.) is heated for 14 hours under reflux with 10 ml. of hexamethyldisilazane and a few crystals of ammonium sulphate. The excess hexamethyldisilazane is stripped off in a water-pump vacuum and the residue distilled under a high vacuum. A colorless oil distils at 140° C./0.001 mm. Hg. 0.65 g. of the resulting bis-trimethylsilyl compound is fused with 1-O-acetyl - 2,3,5 - tri-O-benzoyl-β-D-ribofuranose (1.26 g.) at 140° C. Anhydrous zinc-II-chloride (85 mg.) is added after 5 minutes and the mixture is heated, while stirring intensively, for a further 105 minutes in an oil bath to 160° C. Upon cooling, the melt is dissolved in 6 ml. of chloroform, the dark solution applied to 2 silica gel plates (40 x 20 cms.) and developed three times with chloroform/acetone (9:1). A sharply defined zone is obtained which fluoresces blue-green on irradiation with ultraviolet light of wavelength 366 mμ. Elution with acetone is carried out and the eluate concentrated to dryness. After drying under a high vacuum, the colorless, amorphous 4-amino - 7 - oxo-7,8-dihydro-8-(1-β-D-2,3,5-tri-O-benzoyl-ribofuranosidyl)-pteridin of formula

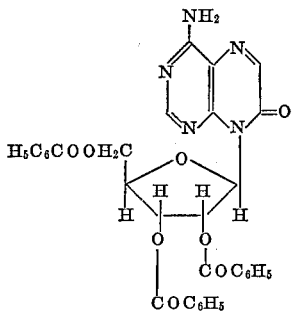

is obtained.

EXAMPLE 17

2 - methylmercapto-4-amino-7-oxo-7,8-dihydro-pteridin (2.8 g.) is heated under reflux for 14 hours in 15 ml. of hexamethyldisilazane and a few crystals of ammonium sulphate. The excess hexamethyldisilazane is stripped off in a water-pump vacuum and the residue distilled under a high vacuum. A faintly yellowish oil distils at 145–147° C./0.001 mm. Hg, which crystallizes on cooling. This product is the bis-trimethylsilyl compound, 3.57 g. of this bis-trimethylsilyl compound is fused with 1-O-acetyl-2,3,5-tri-O-benzoyl-β-D-ribofuranose (5.6 g.) for 5 minutes at 140° C., while stirring vigorously, in a 25 ml. round flask fitted with a calcium chloride tube. Anhydrous zinc-II-chloride (0.32 g.) is then added and the mixture is heated for 75 minutes at an oil bath temperature of 140° C. Upon cooling, the melt is treated with 15 ml. of chloroform and the dark solution poured directly onto a silica gel column 60 cms. in length and 5 cms. in diameter. The column is developed with 3 l. of chloroform/acetone (95:5) and the separation verified by thin layer chromatography. The first 200 ml. of eluate are discarded. The principal product is contained in the succeeding 1.2 l. of eluate. After concentrating the eluate in vacuo, the foam is dried under a high vacuum and the 2-methylmercapto-4-amino-7-oxo-7,8 - dihydro - 8 - (1-β-D-2,3,5-tri-O-benzoyl-ribofuranosidyl)-pteridin is thus obtained.

0.53 g. of this tri-O-benzoyl compound is mixed with 50 ml. of 0.05 n-sodium methylate solution and stirred for 3 hours at 25° C. The mixture is brought with glacial acetic acid to pH 6 and evaporated in vacuo. The residue is treated with a mixture of methanol/water (2:1), evaporated once more and then this process is again repeated. The residue is dissolved at elevated temperature in 15 ml. of methanol, treated with activated charcoal and filtered. The 2 - methylmercapto-4-amino-7-oxo-7,8-dihydro-8-(1-β-D-ribofuranosidyl)-pteridin of formula

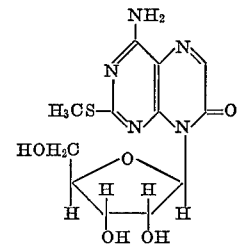

separates on cooling in the form of colorless crystals that melt at 203–205° C.

EXAMPLE 18

2 - amino - 4 - isopropyloxy-7-oxo-7,8-dihydro-pteridin (2.24 g.) is suspended in 30 ml. of hexamethyldisilazane, a few crystals of ammonium sulphate are added and the suspension is heated for 48 hours under reflux. After the reaction mixture has cooled, the excess hexamethyldisilazane is first stripped off in a water-pump vacuum and then the residue is heated to 70° C. by applying an oil pump vacuum. The product can be used for the ribosidation without distillation. The bis-trimethylsilyl compound thus obtained is dissolved 100 ml. of absolute benzene and mixed with 1-bromo-2,3,5-tri-O-benzoyl-β-D-ribofuranose (prepared from 6 g. of 1-O-acetyl-2,3,5-tri-O-benzoyl-β-D-ribofuranose in 100 ml. of methylene chloride at 0° while running in gaseous hydrogen bromide) in 50 ml. of benzene and heated for 6 hours under reflux after addition of 2.5 g. each of mercury-(II)-oxide and mercury-II)-bromide. The undissolved mercury salts are filtered off hot with suction, the filtrate is evaporated to dryness and the residual foam is taken up in chloroform. The chloroform solution is extracted by shaking 3 times with 250 ml. each time of 15% strength potassium iodide solution. The organic phase is then washed with water and after being dried over sodium sulphate, concentrated again to dryness. In the process, an amorphous crude product remains behind. This product is dissolved in chloroform/acetone (9.5:0.5), the solution is poured onto a silica gel sol column (100 x 3 cms.; silica gel Merck 0.05 to 0.2 mm.) and developed with the same solvent mixture that was used for dissolving the substance. Three zones are principally obtained, of which the first contains the unreacted sugar derivatives and the second the 2-amino-4-isopropyloxy-7-oxo-7,8-dihydro - 8 - (1 - D-2,3,5-tri-O-benzoyl-ribofuranosidyl)-pteridin.

0.34 g. of this crude product is taken up in 40 ml. of 0.1 N sodium methylate solution and stirred for 3 hours at ambient temperature. The solution is neutralized with glacial acetic acid, evaporated to dryness, treated twice with water/ethanol (1:1) and evaporated each time anew in order to remove the eliminated benzoic acid methyl ester. The residue is recrystallized from water. The 2-amino - 4 - isopropyloxy-7-oxo-7,8-dihydro-8-(1-D-ribofuranosidyl)pteridin of formula

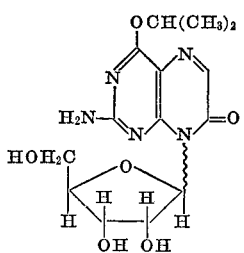

is thus obtained (M.P. from 224° C. with decomposition).

EXAMPLE 19

2-amino-4-methoxy-7-oxo-7,8-dihydro-pteridin (1.93 g. is suspended in 30 ml. of hexamethyldisilazane, 2 drops of concentrated sulphuric acid are added, and the suspension is then heated for 48 hours under reflux. The excess hexamethyldisilazane is stripped off in vacuo and the residue subsequently distilled under a high vacuum, when a yellow oil having a boiling point of 140–150° C./10⁻³ mm. Hg is obtained that congeals at ambient temperature.

(a) 3.27 g. of this bis-trimethylsilyl compound is dissolved in 70 ml. of dichloroethane. 1-O-acetyl-2,3,5-tri-O-benzoyl-ribofuranose (4.54 g.) and 1.06 ml. of tin tetrachloride are added. The mixture is left to stand for 16 hours at 25° C. It is thereafter neutralized with methanolic ammonia and the resulting precipitate filtered off with suction over silica marl. After concentrating to dryness, the residue is taken up in chloroform and filtered again with addition of some silica gel. Repeated concentration yields a crude product which is separated over a silica gel column (60 cms. x 4 cms.) with chloroform/acetone (9.5:0.5). Three zones are obtained, of which the first contains unreacted sugar derivatives. The second zone consists of the 2 - amino-4-methoxy-7-oxo-7,8-dihydro-8-(1-D-2,3,5-tri-O-benzoyl-ribofuranosidyl)-pteridin.

(b) 3.27 g. of this bis-trimethylsilyl compound and 1-bromo - 2,3,5 - tri-O-benzoyl-β-D-ribofuranose (prepared from 6.07 g. of 1-O-acetyl-2,3,5-tri-O-benzoyl-β-D-ribofuranaose) is dissolved in 150 ml. of absolute benzene, mixed with 2.5 g. of mercury-(II)-oxide and mercury-(II)-bromide, and subsequently heated for 4 hours under reflux and with stirring. The undissolved matter is filtered off with suction, the filtrate evaporated to dryness and the foam is taken up in chloroform. The solution is extracted by shaking three times with 250 ml. of 15% strength potassium iodide on each occasion and twice with water. The chloroform layer is dried over sodium sulphate and then concentrated to dryness. The crude product is separated over a silica gel column (70 x 5 cms.) with chloroform/acetone (9.5:0.5) and again yields three fractions. The first zone consists of sugar derivatives and the second contains the 2-amino-4-methoxy-7-oxo-7,8-dihydro-8-(1-D-2,3,5-tri-O-benzoyl-ribofuranosidyl)-pteridin.

0.78 g. of the resutling riboside is mixed with 50 ml. of 0.05 N sodium methylate solution and stirred for 24 hours at 25° C. A precipitate forms already after one hour. Upon completion of the reaction, the precipitate is collected by suction filtration and dried in a vacuum exsiccator. The mother liquor is neutralized with glacial acetic acid and evaporated. The residue is dissolved in a few ml. of methanol. The solution is applied to a silica gel plate (40 x 20 cms.) and developed once with chloroform/methanol (9:1). A further substance is obtained by elution of the 2.5–4.2 cms. zone. Both fractions are dissolved in 30 ml. of water, neutralized and cooled after treatment with a small amount of activated charcoal at elevated temperature, and filtration. After several days, a fine crystalline deposit separates out. The 2-amino-4-methoxy - 7 - oxo-7,8-dihydro-8-(1-D-ribofuranosidyl)pteridin of formula

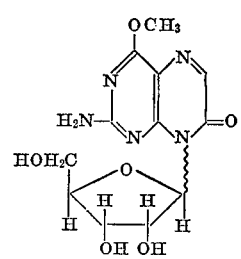

is thus obtained which melts from 260° C. (with darkening).

20 mg. of sodium is dissolved in 20 ml. of absolute methanol and 2-amino-4-benzyloxy-7-oxo-7,8-dihydro-8-(1-β-D-2,3,5-tri-O-benzoyl-ribofuranosidyl)-pteridin (0.5 g.), which has been prepared in analogous manner, is added. The mixture is stirred for 6 days at room temperature and the yellowish precipitate then filtered off. After recrystallization from water, the 2-amino-4-methoxy-7-oxo - 7,8-dihydro-8-(1-D-ribofuranosidyl)-pteridin is obtained which melts from 260° C. (with darkening).

EXAMPLE 20

2 - dimethylamino-4-methoxy-7-oxo-7,8-dihydro-pteridin (0.88 g.) is suspended in 30 ml. of hexamethyldisilazane and heated under reflux for 48 hours at 160° C. The excess hexamethylidisilazane is stripped off in a water-pump vacuum and the residue thereafter dried in an oil pump vacuum. The resulting trimethylsilyl compound is dissolved in 100 ml. of absolute benzene with 1-bromo-2,3,5-tri-O-benzoyl-ribofuranose (prepared from 2.5 g. of 1 - O-acetyl-2,3,5-tri-O-benzoyl-β-D-ribofuranose), mixed with 2 g. each of mercury-(II)-oxide and mercury-(II)-bromide and heated for 6 hours under reflux. The undissolved substance is filtered off with suction while hot and the filtrate evaporated. The residual oil is dissolved in chloroform and extracted by shaking three times with 200 ml. each time of a 15% strength potassium iodide solution. The organic phase is subsequently washed with water twice and dried over sodium sulphate. It is concentrated to dryness and the crude product separated over a silica gel column (100 x 5 cms.). In the process, three zones are obtained of which the first and third are each developed again over 2 silica gel plates (40 x 20 cms.) with chloroform/acetone (9.5:0.5.) The 11.5–13 cms. zones are eluted and combined with zone 2 of the column separation. After concentrating to dryness, the 2-dimethylamino - 4 - methoxy-7-oxo-7,8-dihydro-8-(1-β-D-2,3,5-tri-O-benzoyl-ribofuranosidyl)-pteridin is obtained as a yellowish foam.

1.2 g. of this compound is mixed with 100 ml. of 0.05 N sodium methylate solution and stirred for 16 hours at 25° C. The mixture is neutralized with acetic acid and evaporated. The residue is taken up with ethanol/water (1:1), evaporated, and this process repeated once again. The residual syrup is dissolved at elevated temperature in 5 ml. of water/ethanol (1:1) and the solution allowed to cool slowly. Colorless crystals separate out and further material is isolated from the mother liquor after chromatography over a silica gel plate (40 x 20 cms.) and developing three times with chloroform/acetone (9.5:0.5) from the 3–4.5 cms. zone. The 2-dimethylamino-4-methoxy-7-oxo-7,8-dihydro-8-(1 - β - D - riboflruanosidyl)-pteridin of formula

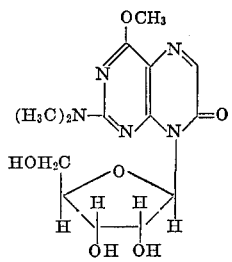

is obtained in the form of colorless crystals (M.P. 192° C.).

EXAMPLE 21

(a) 2-amino-4-benzyloxy-7-oxo-7,8-dihydro - pteridin (2.5 g.) is heated for 16 hours under reflux and with exclusion of moisture in 10 ml. of hexamethyldisilazane in the presence of some crystals of ammonium sulphate. The excess hexamethyldisilazane is stripped off in vacuo. The resulting silyl compound is dissolved in 50 ml. of acetonitrile, and a solution of 1-bromo-2,3,5-tri-O-benzoyl-ribofuranose (prepared from 5 g. of 1-O-acetyl-2,3,5-tri-O-benzoyl-ribofuranose) in 40 ml. of acetonitrile is added. The reaction solution is left to stand for 4 weeks at room temperature in a well sealed flask. It is thereafter treated with methanol and evaporated to dryness. The residue is taken up in chloroform and the undissolved substance filtered off. After renewed evaporation, an amorphous product is obtained. The separation is carried out over 2 mm. thick silica gel plates (40 x 20 cms.), with 250 mg. being applied in each case per plate and developing three times in benzene/chloroform/acetone (5:4:1). Separation into several zones results, of which the light blue fluorescent zone having an $R_f$ value of approx. 0.58 is eluted with acetone. After concentrating with ethanol, crystallization occurs. The 2-amino-4-benzyloxy-7-oxo-7,8-dihydro-8-(1-β-D-2,3-5-tri-O-benzoyl-ribofuranosidyl)-pteridin of formula

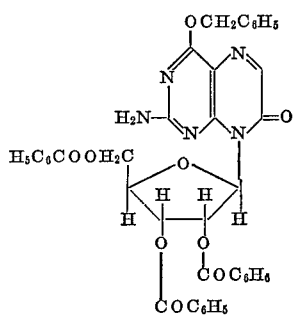

is thus obtained (M.P. 186–190° C.).

(b) 2-amino-4-benzoyloxy-7-oxo-7,8-dihydro - pteridin (2 g.) is silylized as described in (a). After stripping off the excess hexamethyldisilazane, the residue is dissolved in 50 ml. of absolute benzene, 1-bromo-2,3,5-tri-O-benzoyl-ribofuranose (prepared from 4.2 g. of 1-O-acetyl-2,3,5-tri-O-benzoyl-ribofuranose), dissolved in 60 ml. of absolute benzene, 1.0 g. of mercury-(II)-oxide and 3 g. of mercury-(II)-bromide are added. After heating for 3 hours under reflux, some methanol is added and the reaction mixture concentrated to dryness. The residue is dissolved in 100 ml. of chloroform and extracted by shaking twice with 50 ml. each time of 15% strength potassium iodide solution and once with 50 ml. of water. The organic phase is dried over sodium sulphate and concentrated to dryness anew. The residual yellowish foam is separated, as described in (a), on 2 mm. thick silica gel plates (40 x 20 cms.) in benzene/chloroform/acetone (5:4:1). The 2-amino-4-benzyloxy-7-oxo-7,8-dihydro-8-(1-β-D-2,3,5-tri - O - benzoylribofuranosidyl)-pteridin is obtained from zone 3 ($R_f$=0.58) and recrystallized from ethanol (M.P. 193–194° C.).

EXAMPLE 22

2-amino-4,7-dioxo-3,4,7,8-tetrahydro-pteridin (isoxanthopterin) (5.01 g.) is suspended in 30 ml. of hexamethyldisilazane, 2 drops of concentrated sulphuric acid are added, and the suspension is heated, with stirring, for 30 hours at 160° C. After the reaction mixture has cooled, the excess hexamethyldisilazane is stripped off in vacuo and the residue distilled under a high vacuum. A light yellow oil is obtained that congeals at ambient temperature and has a boiling point of 140–150° C./10⁻³ mm. Hg. This product is a tris-trimethylsilyl derivative.

This tris-trimethylsilyl compound is dissolved in 75 ml. of absolute benzene and mixed with 1-bromo-2,3,5-tri-O-benzoyl-ribofuranose (prepared from 15.2 g. of 1-O-acetyl-2,3,5-tri-O-benzoylribofuranose) in 75 ml. of absolute benzene. After addition of 5 g. each of mercury-(II)-oxide and mercury-(II)-bromide, the reaction mixture is heated under reflux for 5½ hours. The mercury salts are filtered off with suction while hot and the filtrate is evaporated to dryness. The residual foam is taken up in chloroform and extracted by shaking three times with 300 ml. each time of 15% strength potassium iodide solution. The organic phase is washed with water and dried over sodium sulphate. After renewed concentration to dryness, a crude product is obtained in the form of a foam. The separation and purification are effected over a silica gel column (70 x 5 cms.) by developing with chloroform/acetone (9.5:0.5). In the process, the non-reacted sugar derivatives, for example, are eluted; whereas the desired monoriboside remains in the column. This latter is subsequently eluted from the column with chloroform/methanol (9:1). The 8-(1-β-D-2,3,5-tri-O-benzoyl - ribofuranosidyl) - isoxanthopeterin is thus obtained.

(a) 1.8 g. of 8 - (1 - β - D - 2,3,5 - tri - O - benzoyl-ribofuranosidyl)-isoxanthopterin is suspended in 150 ml. of 0.1 N sodium methylate solution and stirred for 12 hours at ambient temperature. The sodium salt of the debenzoylised isoxanthopterin-N-8-riboside separates out already after 30 minutes. Upon completion of the reaction, the suspension is neutralized with glacial acetic acid and concentrated to dryness. In order to remove the benzoic acid methyl ester that has formed, the residue is treated repeatedly with water/ethanol (1:1), filtered and evaporated. The residue is dissolved thereafter in 600 ml. of water, treated with a small amount of activated charcoal at elevated temperature, and slowly allowed to cool. After the solution has been left to stand for some days at 25° C., the product separates out in the form of crystals. The product is dried at 100° C. over phosphorus pentoxide in vacuo and the 8-(1-β-D-ribofuranosidyl)-isoxanthopterin of formula

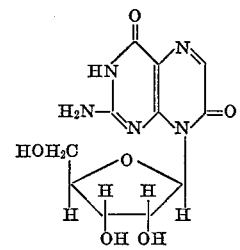

thus obtained which melts at >300° C. (with discoloration from 240° C.).

(b) 8 - (1 - β - D - 2,3,5 - tri - O - benzoy l- ribofuranosidyl)isoxanthopterin (0.16 g.) is suspended in 20 ml. of absolute methanol which contains 7 mg. of sodium, and stirred for 16 hours at ambient temperature. The suspension is treated with water, neutralized with diluted acetic acid and evaporated to dryness. In order to remove the benzoic acid methyl ester, the residue is treated repeatedly with water/ethanol (1:1), filtered and evaporated. The residue is recrystallized from a large amount of water. The 8 - (1 - β - D - ribofuranosidyl)-isoxanthopterin is thus obtained in the form of yellowish crystal needles (M.P.>300° C.).

EXAMPLE 23

Tablets containing 50 mg. of active substance are manufactured in the usual way:

| Composition: | Mg. |
|---|---|
| 2-amino-4-dimethylamino - 7 - oxo-7,8-dihydro-8-(1-β-D-ribofuranosidyl)pteridin | 50 |
| Wheat starch | 59 |
| Lactose | 70 |
| Colloidal silica | 10 |
| Talcum | 10 |
| Magnesium stearate | 1 |
| | 200 |

The 2-amino - 4 - dimethylamino - 7 - oxo-7,8-dihydro-8 - (1 - β - D - ribofuranosidyl) - pteridin is mixed with a portion of the wheat starch, with lactose and colloidal silica and the mixture passed through a sieve. A further portion of the wheat starch is pasted with five times its quantity of water on a water bath, and the powder mixture kneaded with this paste until a slightly plastic mass is obtained.

The plastic mass is pressed through a 3 mm. mesh sieve, dried, and the resulting dry granulate passed through a sieve once more. The remained of the wheat starch, talcum and magnesium stearate are thereafter admixed and the mixture compressed into tablets each weighing 200 mg. with dividing groove.

I claim:

1. A compound selected from the group consisting of glycosidyl-pteridines of the formula

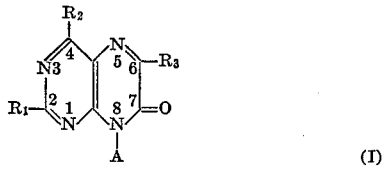

(I)

wherein A stands for a member selected from 1-aldopentosidyl, 1-aldohexosidyl, mono-desoxygenated 1-aldopentosidyl, mono-desoxygenated 1-aldohexosidyl, or said radicals having one or more hydroxyl groups esterified by a member selected from lower alkanoyl and benzoyl, or etherified by phenyl-lower alkyl, $R_1$, $R_2$ and $R_3$ each stands for a member selected from hydrogen, lower alkyl, phenyl-lower alkyl, phenyl, lower alkyl phenyl, lower alkoxy phenyl, halogeno phenyl, trifluoromethyl phenyl, free amino, mono-lower alkylamino, di-lower alkylamino, phenyl amino, N-phenyl-N-lower alkylamino, hydroxy, lower alkoxy, phenyl-lower alkoxy, halogen, mercapto, lower alkylmercapto, phenyl-lower alkylmercapto, carboxy, lower alkoxy carbonyl and phenyl-lower alkoxy carbonyl, its tautomers and its pharmaceutically usable non-toxic acid addition salts, with the exception of 2-methylmercapto-4-amino - 6,7 - dioxo - 8 - [β-D-glucopyranosidyl-(1)]-5,6,7,8-tetrahydropteridine, 2-dimethylamino - 6 - methyl - 7 - oxo - 8 - [β - D - glucopyranosidyl - (1)] - 7,8 - pteridine, the corresponding galactopyranosidyl - (1) compound as well as their 2′,3′,4′,6′-tetrahydro - O - acetyl derivatives thereof, and 4-dimethylamino - 6 - methyl - 7 - oxo - 8 - [β-D-glycopyranosidyl-(1)] - 7,8 - dihydropteridine, its 2′,3′,4′,6′-tetra-O-acetyl compound and 4-dimethylamino - 7 - oxo - 8 - [2′,3′,4′,6′-tetra - O - acetyl - β - D - glycopyranosidyl - (1)]-7,8-dihydropteridine.

2. A product is claimed in claim 1, wherein A stands for a member selected from 1-aldopentosidyl, 1-aldohexosidyl, mono-desoxygenated 1-aldopentosidyl, mono-desoxygenated 1-aldohexosidyl, or said radicals having one or more hydroxyl groups esterified by a member selected from lower alkanoyl and benzoyl or etherified by benzyl, one of $R_1$, $R_2$ and $R_3$ stands for a member selected from free amino, hydroxy and mercapto and the others each stand for a member selected from free amino, mono-lower alkylamino, di-lower alkylamino, phenyl amino, N-lower alkyl N-phenyl amino, phenyl amino and N-lower alkyl N-phenyl amino in which the phenyl portion is substituted by a member selected from lower alkyl, lower alkoxy, halogen and trifluoromethyl, and furthermore hydroxy, lower alkoxy, mercapto, lower alkyl mercapto, phenyl-lower alkyl mercapto, halogen, lower alkyl, phenyl-loweralkyl and hydrogen.

3. A product as claimed in claim 1, wherein A stands for a member selected from 1-ribofuranosidyl, 2-desoxy-1-ribofuranosidyl and 1-arabinofuranosidyl, or said radicals having one or more hydroxyl groups esterified by a member selected from acetyl and benzoyl or etherified by benzyl, one of $R_1$, $R_2$ and $R_3$ stands for a member selected from free amino, hydroxy and mercapto and the others each stand for a member selected from free amino, methylamino, dimethylamino, hydroxy, methoxy, mercapto, methylmercapto, benzylmercapto, fluorine, chlorine, methyl, benzyl and hydrogen.

4. A product as claimed in claim 1, being a compound selected from 2-dimethylamino-4-methoxy-7-oxo-8-(1-D-ribofuranosidyl) - 7,8 - dihydro-pteridine, 2 - dimethylamino-7-oxo-8-(1 - D - ribofuranosidyl)-7,8-dihydro-pteridine, 2-dimethylamino-7-oxo-8-(2′,3′,4′,6′ - tetra-O-acetyl-1-D-glucopyranosidyl) - 7,8 - dihydro-pteridine, 7-oxo-8-(2′,3′,4′,6′ - tetra - O - acetyl - 1 - D - glucopyranosidyl) - 7,8 - dihydro - pteridine, 7 - oxo - 8 - (2′,3′,5′ - tri - O - benzoyl - 1 - D - ribofuranosidyl) - 7,8 - dihydro-pteridine, 2 - dimethylamino - 7 - oxo - 8 - (1 - D - desoxyribofuranosidyl) - 7,8 - dihydro - pteridine, 2 - amino-7-oxo-8 - (1 - D - ribofuranosidyl) - 7,8 - dihydro-pteridine, 4-amino - 7 - oxo - 8 - (1-D-ribofuranosidyl)-7,8-dihydropteridine, 2 - hydroxy - 7 - oxo - 8 - (1 - D - ribofuranosidyl) - 7,8 - dihydro - pteridine, 4 - hydroxy - 7 - oxo - 8 - (1 - D - ribofuranosidyl)-7,8-dihydro-pteridine, 2 - hydroxy - 4 - amino - 7 - oxo - 8 - (1 - D - ribofuranosidyl) - 7,8 - dihydro - pteridine, 2,4,6 - trihydroxy-7 - oxo - 8 - (1 - D - ribofuranosidyl) - 7,8 - dihydropteridine, 2,4,6 - triamino - 7 - oxo - 8 - (1 - D - ribofuranosidyl) - 7,8 - dihydro - pteridine, 2,6 - diamino-4-hydroxy - 7 - oxo - 8 - (1 - D - ribofuranosidyl) - 7,8-dihydropteridine, 2,6 - dihydroxy - 4 - amino - 7 - oxo-8-(1 - D - ribofuranosidyl) - 7,8 - dihydro - pteridine, 2,4-dihydroxy - 7 - oxo - 8 - (1 - D - ribofuranosidyl) - 7,8-dihydro - pteridine, 2,4 - diamino - 7 - oxo - 8 - (1-D-ribofuranosidyl) - 7,8 - dihydro - pteridine, 2 - amino-4-hydroxy - 7 - oxo - 8 - (1 - D - ribofuranosidyl) - 7,8-dihydro - pteridine and 2 - amino - 4,6 - dihydroxy-7-oxo - 8 - (1 - D - ribofuranosidyl)-7,8-dihydro-pteridine.

5. A product as claimed in claim 1, being a compound selected from 2-methylmercapto - 4 - dimethylamino - 7-oxo - 7,8 - dihydro - 8 - (1 - D - 2,3,5,-tri-O-benzoyl-ribofuranosidyl)-pteridine, 2 - methylmercapto - 4 - amino-6 - methoxycarbonyl - 7 - oxo - 7,8 - dihydro - 8 - (1-D-ribofuranosidyl) - pteridine, 2-methylmercapto-4-amino-6 - ethoxycarbonyl - 7 - oxo - 7,8 - dihydro - 8 - (1-D-2,3,5 - tri - O - benzoylribofuranosidyl) - pteridine, 2-amino - 4 - dimethylamino - 7 - oxo - 7,8 - dihydro-8-(1-D - ribofuranosidyl) - pteridine, 4 - dimethylamino-7-oxo - 7,8 - dihydro - 8 - (1 - D - 2,3,5, - tri-O-benzoyl-ribofuranosidyl) - pteridine, 2 - benzylmercapto - 4 - amino - 6 - ethoxycarbonyl - 7 - oxo - 7,8 - dihydro -8-(1 - D - 2,3,5 - tri - O - benzoyl - ribofuranosidyl)-pteridine, 4 - amino - 7 - oxo - 7,8 - dihydro - 8 - (1-D-2,3,5-tri - O - benzoyl - ribofuranosidyl) - pteridine, 2 - amino-4 - benzyloxy - 7 - oxo - 7,8 - dihydro - 8 - (1 - D-2,3,5-tri - O - benzoyl - ribofuranosidyl) - pteridine, 2-methylmercapto - 4 - amino - 7 - oxo - 7,8 - dihydro - 8 -(1-D-ribofuranosidyl)-pteridine, 2 - amino - 4 - isopropyloxy-7-oxo - 7,8 - dihydro - 8 - (1-D-ribofuranosidyl)-pteridine, 2-amino-4-methoxy - 7 - oxo - 7,8 - dihydro-8-(1-D-ribofuranosidyl) - pteridine, 2-dimethylamino-4-methoxy-7-oxo - 7,8 - dihydro - 8 - (1-D-ribofuranosidyl)-pteridine.

6. A product as claimed in claim 1, being 2-amino-4-dimethylamino - 7 - oxo - 7,8 - dihydro - 8 - (1-D-ribofuranosidyl)-pteridine.

7. A compound selected from 2-desoxyribofuranosidyl and arabinofuranosidyl compounds corresponding to the compounds according to claim 4.

8. A compound selected from O-acetyl and O-benzoyl derivatives of compounds according to claim 4.

9. An α-anomer of a compound according to claim 1.
10. A β-anomer of a compound according to claim 1.
11. A pharmaceutically usable non-toxic acid addition salt of a compound according to claim 4.

References Cited
UNITED STATES PATENTS 3,427,383  2/1969  Lapidus et al. ____ 260—211.5 R

OTHER REFERENCES

Goodwin et al.: "Chem. Abst.," vol. 60, 1964, p. 11062.
Pfleiderer et al.: "Chem. Abst.," vol. 60, 1964, 13307.

LEWIS GOTTS, Primary Examiner
J. R. BROWN, Assistant Examiner

U.S. Cl. X.R.

424—180